United States Patent
Oldroyd et al.

(10) Patent No.: US 10,913,541 B2
(45) Date of Patent: *Feb. 9, 2021

(54) AIRCRAFT HAVING REDUNDANT DIRECTIONAL CONTROL

(71) Applicant: Textron Innovations Inc., Providence, RI (US)

(72) Inventors: Paul K. Oldroyd, Azle, TX (US); John Richard McCullough, Weatherford, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/790,676

(22) Filed: Feb. 13, 2020

(65) Prior Publication Data

US 2020/0231297 A1  Jul. 23, 2020

Related U.S. Application Data

(63) Continuation of application No. 15/972,431, filed on May 7, 2018, now Pat. No. 10,597,164, which is a (Continued)

(51) Int. Cl.
*B64D 31/10* (2006.01)
*B64D 27/24* (2006.01)
(Continued)

(52) U.S. Cl.
CPC ............. *B64D 31/10* (2013.01); *B64C 27/52* (2013.01); *B64C 29/02* (2013.01); *B64C 39/024* (2013.01);
(Continued)

(58) Field of Classification Search
CPC ........ B64D 31/10; B64D 27/24; B64D 27/26; B64C 27/52; B64C 29/02; B64C 39/024;
(Continued)

(56) References Cited

U.S. PATENT DOCUMENTS 1,655,113 A   1/1928   Nikola
2,601,090 A   6/1952   James
(Continued)

FOREIGN PATENT DOCUMENTS

CN   105539833 A   5/2016
FR   2977865 A3    1/2013
(Continued)

OTHER PUBLICATIONS

Air Launched Unmanned Disaster Relief Delivery Vehicle, 33rd Annual AHS Student Design Competition, University of Maryland, Undated but admitted prior art.
(Continued)

*Primary Examiner* — Benjamin P Lee
(74) *Attorney, Agent, or Firm* — Lawrence Youst PLLC

(57) ABSTRACT

An aircraft has an airframe with a two-dimensional distributed thrust array attached thereto having a plurality of propulsion assemblies that are independently controlled by a flight control system. Each propulsion assembly includes a housing with a gimbal coupled thereto that is operable to tilt about first and second axes responsive to first and second actuators. A propulsion system is coupled to and operable to tilt with the gimbal. The propulsion system includes an electric motor having an output drive and a rotor assembly having a plurality of rotor blades that rotate in a rotational plane to generate thrust having a thrust vector. Responsive to a thrust vector error of a first propulsion assembly, the flight control system commands at least a second propulsion assembly, that is symmetrically disposed relative to the first propulsion assembly, to counteract the thrust vector error, thereby providing redundant directional control for the aircraft.

20 Claims, 18 Drawing Sheets

Related U.S. Application Data continuation-in-part of application No. 15/606,242, filed on May 26, 2017, now Pat. No. 10,501,193, which is a continuation-in-part of application No. 15/200,163, filed on Jul. 1, 2016, now Pat. No. 9,963,228.

(60) Provisional application No. 62/594,424, filed on Dec. 4, 2017.

(51) Int. Cl.

| | | |
|---|---|---|
| *B64C 29/02* | (2006.01) | |
| *B64C 39/02* | (2006.01) | |
| *B64C 27/52* | (2006.01) | |
| *G05D 1/00* | (2006.01) | |
| *B64D 27/26* | (2006.01) | |
| *G05D 3/00* | (2006.01) | |
| *G05D 1/10* | (2006.01) | |

(52) U.S. Cl.
CPC ............ *B64D 27/24* (2013.01); *B64D 27/26* (2013.01); *G05D 1/0072* (2013.01); *G05D 1/0077* (2013.01); *G05D 1/101* (2013.01); *G05D 3/00* (2013.01); *B64C 2201/021* (2013.01); *B64C 2201/024* (2013.01); *B64C 2201/042* (2013.01); *B64C 2201/108* (2013.01); *B64C 2201/165* (2013.01); *Y02T 50/60* (2013.01)

(58) Field of Classification Search
CPC ........ B64C 2201/021; B64C 2201/024; B64C 2201/042; B64C 2201/108; B64C 2201/165; G05D 1/0072; G05D 1/0077; G05D 1/101; G05D 3/00; Y02T 50/62
See application file for complete search history.

(56) References Cited

U.S. PATENT DOCUMENTS

| | | |
|---|---|---|
| 2,655,997 A | 10/1953 | Peterson |
| 2,688,843 A | 9/1954 | Pitt |
| 3,002,712 A | 10/1961 | Sterling |
| 3,081,964 A | 3/1963 | Quenzler |
| 3,181,810 A | 5/1965 | Olson |
| 3,259,343 A | 7/1966 | Roppel |
| 3,289,980 A | 12/1966 | Gardner |
| 3,350,035 A | 10/1967 | Schlieben |
| 3,592,412 A | 7/1971 | Glatfelter |
| 3,618,875 A | 11/1971 | Kappus |
| 3,783,618 A | 1/1974 | Kawamura |
| 3,916,588 A | 11/1975 | Magill |
| 4,243,358 A | 1/1981 | Carlock et al. |
| 4,458,864 A | 7/1984 | Colombo et al. |
| 4,571,157 A | 2/1986 | Eickmann |
| 4,596,368 A | 6/1986 | Schmittle |
| 4,613,098 A | 9/1986 | Eickmann |
| 4,741,672 A | 5/1988 | Breuner |
| 4,771,967 A | 9/1988 | Geldbaugh |
| 4,913,377 A | 4/1990 | Eickmann |
| 4,925,131 A | 5/1990 | Eickmann |
| 5,131,605 A | 7/1992 | Kress |
| 5,188,512 A | 2/1993 | Thornton |
| 5,592,894 A | 1/1997 | Johnson |
| 5,842,667 A | 12/1998 | Jones |
| 6,086,015 A | 7/2000 | MacCready |
| 6,170,778 B1 | 1/2001 | Cycon et al. |
| 6,260,793 B1 | 7/2001 | Balayn et al. |
| 6,270,038 B1 | 8/2001 | Cycon et al. |
| 6,402,088 B1 | 6/2002 | Syrovy et al. |
| 6,655,631 B2 | 12/2003 | Austen-Brown |
| 6,845,939 B1 | 1/2005 | Baldwin |
| 6,886,776 B2 | 5/2005 | Wagner et al. |
| 6,892,980 B2 | 5/2005 | Kawai |
| 7,059,562 B2 | 6/2006 | Baldwin |
| 7,150,429 B2 | 12/2006 | Kusic |
| 7,210,654 B1 | 5/2007 | Cox et al. |
| 7,465,236 B2 | 12/2008 | Wagels |
| 7,472,863 B2 | 1/2009 | Pak |
| 7,555,893 B2 | 7/2009 | Okai et al. |
| 7,984,684 B2 | 7/2011 | Hinderks |
| 8,152,096 B2 | 4/2012 | Smith |
| 8,393,564 B2 | 3/2013 | Kroo |
| 8,505,846 B1 | 8/2013 | Sanders |
| 8,602,348 B2 | 12/2013 | Bryant |
| 8,646,720 B2 | 2/2014 | Shaw |
| 8,733,690 B2 | 5/2014 | Bevirt et al. |
| 8,800,912 B2 | 8/2014 | Oliver |
| 8,820,672 B2 | 9/2014 | Erben et al. |
| 8,833,692 B2 | 9/2014 | Yoeli |
| 8,909,391 B1 | 12/2014 | Peeters et al. |
| 8,948,935 B1 | 2/2015 | Peeters et al. |
| 9,022,312 B2 | 5/2015 | Kosheleff |
| 9,045,226 B2 | 6/2015 | Piasecki et al. |
| 9,087,451 B1 | 7/2015 | Jarrell |
| 9,108,744 B2 | 8/2015 | Takeuchi |
| 9,109,575 B2 | 8/2015 | Weddendorf et al. |
| 9,120,560 B1 | 9/2015 | Armer et al. |
| 9,127,908 B2 | 9/2015 | Miralles |
| 9,162,753 B1 | 10/2015 | Panto et al. |
| 9,187,174 B2 | 11/2015 | Shaw |
| 9,193,460 B2 | 11/2015 | Laudrain |
| 9,221,538 B2 | 12/2015 | Takahashi et al. |
| 9,242,714 B2 | 1/2016 | Wang et al. |
| 9,254,916 B2 | 2/2016 | Yang |
| 9,284,049 B1 | 3/2016 | Wang et al. |
| 9,321,530 B2 | 4/2016 | Wang et al. |
| 9,376,208 B1 | 6/2016 | Gentry |
| 9,388,794 B2 | 7/2016 | Weddendorf et al. |
| 9,403,593 B2 | 8/2016 | Downey et al. |
| 9,440,736 B2 | 9/2016 | Bitar |
| 9,463,875 B2 | 10/2016 | Abuelsaad et al. |
| 9,493,225 B2 | 11/2016 | Wang et al. |
| 9,610,817 B1 | 4/2017 | Piasecki et al. |
| 9,643,720 B2 | 5/2017 | Hesselbarth |
| 9,694,908 B2 | 7/2017 | Razroev |
| 9,694,911 B2 | 7/2017 | Bevirt et al. |
| 9,714,087 B2 | 7/2017 | Matsuda |
| 9,798,322 B2 | 10/2017 | Bachrach et al. |
| 9,800,091 B2 | 10/2017 | Nugent, Jr. et al. |
| 9,821,909 B2 | 11/2017 | Moshe |
| 9,963,228 B2 | 5/2018 | McCullough et al. |
| 9,994,313 B2 | 6/2018 | Claridge et al. |
| 10,011,351 B2 | 7/2018 | McCullough et al. |
| 10,124,890 B2 | 11/2018 | Sada-Salinas et al. |
| 10,183,746 B2 | 1/2019 | McCullough et al. |
| 10,214,285 B2 | 2/2019 | McCullough et al. |
| 10,220,944 B2 | 3/2019 | McCullough et al. |
| 10,227,133 B2 | 3/2019 | McCullough et al. |
| 10,232,950 B2 | 3/2019 | McCullough et al. |
| 10,301,016 B1 | 5/2019 | Bondarev et al. |
| 10,322,799 B2 | 6/2019 | McCullough et al. |
| 2002/0100834 A1 | 8/2002 | Baldwin |
| 2002/0100835 A1 | 8/2002 | Kusic |
| 2003/0062443 A1 | 4/2003 | Wagner et al. |
| 2004/0245374 A1 | 12/2004 | Morgan |
| 2006/0091258 A1 | 5/2006 | Chiu et al. |
| 2006/0266881 A1 | 11/2006 | Hughey |
| 2007/0212224 A1 | 9/2007 | Podgurski |
| 2007/0221780 A1 | 9/2007 | Builta |
| 2009/0008499 A1 | 1/2009 | Shaw |
| 2010/0147993 A1 | 6/2010 | Annati et al. |
| 2010/0193644 A1 | 8/2010 | Karem |
| 2010/0295321 A1 | 11/2010 | Bevirt |
| 2011/0001001 A1 | 1/2011 | Bryant |
| 2011/0042508 A1 | 2/2011 | Bevirt |
| 2011/0042509 A1 | 2/2011 | Bevirt et al. |
| 2011/0057453 A1 | 3/2011 | Roberts |
| 2011/0121570 A1 | 5/2011 | Bevirt et al. |
| 2011/0315806 A1 | 12/2011 | Piasecki et al. |
| 2012/0209456 A1 | 8/2012 | Harmon et al. |
| 2012/0234968 A1 | 9/2012 | Smith |
| 2013/0020429 A1 | 1/2013 | Kroo |

(56) References Cited

U.S. PATENT DOCUMENTS

| | | |
|---|---|---|
| 2013/0175404 A1 | 7/2013 | Shefer |
| 2013/0341458 A1 | 12/2013 | Sutton et al. |
| 2014/0018979 A1 | 1/2014 | Goossen et al. |
| 2014/0097290 A1 | 4/2014 | Leng |
| 2014/0339372 A1 | 11/2014 | Dekel et al. |
| 2015/0012154 A1 | 1/2015 | Senkel et al. |
| 2015/0014475 A1 | 1/2015 | Taylor et al. |
| 2015/0136897 A1 | 5/2015 | Seibel et al. |
| 2015/0284079 A1 | 10/2015 | Matsuda |
| 2015/0285165 A1 | 10/2015 | Steinwandel et al. |
| 2016/0068265 A1 | 3/2016 | Hoareau et al. |
| 2016/0180717 A1 | 6/2016 | Ubhi et al. |
| 2016/0214712 A1 | 7/2016 | Fisher et al. |
| 2017/0008627 A1 | 1/2017 | Soto et al. |
| 2017/0021924 A1 | 1/2017 | Kubik et al. |
| 2017/0066531 A1 | 3/2017 | McAdoo |
| 2017/0097644 A1 | 4/2017 | Fegely et al. |
| 2017/0144746 A1 | 5/2017 | Schank et al. |
| 2017/0158312 A1 | 6/2017 | Alber et al. |
| 2017/0174342 A1 | 6/2017 | Huang |
| 2017/0240274 A1 | 8/2017 | Regev |
| 2017/0297699 A1 | 10/2017 | Alber et al. |
| 2017/0327219 A1 | 11/2017 | Alber |
| 2017/0334557 A1 | 11/2017 | Alber et al. |
| 2017/0338710 A1* | 11/2017 | Liu .................... H02K 11/215 |
| 2018/0002011 A1 | 1/2018 | McCullough et al. |
| 2018/0002012 A1 | 1/2018 | McCullough et al. |
| 2018/0002013 A1 | 1/2018 | McCullough et al. |
| 2018/0002014 A1 | 1/2018 | McCullough et al. |
| 2018/0002015 A1 | 1/2018 | McCullough et al. |
| 2018/0002016 A1 | 1/2018 | McCullough et al. |
| 2018/0002026 A1 | 1/2018 | Oldroyd et al. |
| 2018/0002027 A1 | 1/2018 | McCullough et al. |
| 2018/0022467 A1 | 1/2018 | Alber |
| 2018/0044011 A1 | 2/2018 | Reichert |
| 2018/0244377 A1 | 8/2018 | Chan |
| 2018/0244383 A1 | 8/2018 | Valente et al. |
| 2018/0265193 A1 | 9/2018 | Gibboney et al. |
| 2018/0273160 A1 | 9/2018 | Baldwin et al. |
| 2018/0327092 A1 | 11/2018 | Deng et al. |
| 2018/0362158 A1 | 12/2018 | Zhang et al. |
| 2019/0031331 A1 | 1/2019 | McCullough et al. |
| 2019/0031334 A1 | 1/2019 | McCullough et al. |
| 2019/0031335 A1 | 1/2019 | McCullough et al. |
| 2019/0031336 A1 | 1/2019 | McCullough et al. |
| 2019/0031337 A1 | 1/2019 | McCullough et al. |
| 2019/0031338 A1 | 1/2019 | McCullough et al. |
| 2019/0031339 A1 | 1/2019 | McCullough et al. |
| 2019/0031361 A1 | 1/2019 | McCullough et al. |
| 2019/0144108 A1 | 5/2019 | McCullough et al. |
| 2019/0263516 A1 | 8/2019 | McCullough et al. |
| 2019/0389573 A1 | 12/2019 | Kahou et al. |

FOREIGN PATENT DOCUMENTS

| | | |
|---|---|---|
| GB | 587388 A | 4/1947 |
| GB | 618475 A | 2/1949 |
| GB | 654089 A | 6/1951 |
| WO | 2001074659 A1 | 10/2001 |
| WO | 2005039973 A2 | 5/2005 |
| WO | 2014067563 A1 | 5/2014 |

OTHER PUBLICATIONS

Bell and NASA Partner for UAV Development; Transportup.com; Sep. 9, 2018.

Bell APT—Automatic Pod Transport; SUASNEWS.com; Dec. 6, 2017.

Bell Autonomous Pod Transport; MONCH.com; May 2, 2018.

* cited by examiner

AIRCRAFT HAVING REDUNDANT DIRECTIONAL CONTROL

CROSS-REFERENCE TO RELATED APPLICATIONS

The present application is a continuation of co-pending application Ser. No. 15/972,431 filed May 7, 2018, which claims the benefit of U.S. Provisional Application No. 62/594,424, filed Dec. 4, 2017 and which is a continuation-in-part of application Ser. No. 15/606,242 filed May 26, 2017, which is a continuation-in-part of application Ser. No. 15/200,163 filed Jul. 1, 2016, the entire contents of each is hereby incorporated by reference.

TECHNICAL FIELD OF THE DISCLOSURE

The present disclosure relates, in general, to aircraft operable to transition between thrust-borne flight and wing-borne flight and, in particular, to aircraft having a distributed thrust array including a plurality of propulsion assemblies each having a gimbal mounted propulsion system operable for thrust vectoring.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the airplane in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of VTOL aircraft is a helicopter which is a rotorcraft having one or more rotors that provide lift and thrust to the aircraft. The rotors not only enable hovering and vertical takeoff and landing, but also enable, forward, backward and lateral flight. These attributes make helicopters highly versatile for use in congested, isolated or remote areas where fixed-wing aircraft may be unable to takeoff and land. Helicopters, however, typically lack the forward airspeed of fixed-wing aircraft.

A tiltrotor aircraft is another example of a VTOL aircraft. Tiltrotor aircraft generate lift and propulsion using propro-tors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation for forward flight, wherein the fixed wing provides lift and the proprotors provide forward thrust. In this manner, tiltrotor aircraft combine the vertical lift capability of a helicopter with the speed and range of fixed-wing aircraft. Tiltrotor aircraft, however, typically suffer from downwash inefficiencies during vertical takeoff and landing due to interference caused by the fixed wing.

A further example of a VTOL aircraft is a tiltwing aircraft that features a rotatable wing that is generally horizontal for forward flight and rotates to a generally vertical orientation for vertical takeoff and landing. Propellers are coupled to the rotating wing to provide the required vertical thrust for takeoff and landing and the required forward thrust to generate lift from the wing during forward flight. The tiltwing design enables the slipstream from the propellers to strike the wing on its smallest dimension, thus improving vertical thrust efficiency as compared to tiltrotor aircraft. Tiltwing aircraft, however, are more difficult to control during hover as the vertically tilted wing provides a large surface area for crosswinds typically requiring tiltwing aircraft to have either cyclic rotor control or an additional thrust station to generate a moment.

SUMMARY

In a first aspect, the present disclosure is directed to an aircraft having redundant directional control. The aircraft has an airframe with a two-dimensional distributed thrust array attached thereto. The thrust array includes a plurality of propulsion assemblies each of which is independently controlled by a flight control system. Each propulsion assembly includes a housing having a gimbal coupled thereto that is operable to tilt about first and second axes. First and second actuators are operable to tilt the gimbal respectively about the first and second axes. A propulsion system is coupled to and is operable to tilt with the gimbal. The propulsion system includes an electric motor having an output drive and a rotor assembly having a plurality of rotor blades. The rotor assembly is rotatable with the output drive of the electric motor in a rotational plane to generate thrust having a thrust vector. Responsive to a thrust vector error of a first propulsion assembly, the flight control system commands at least a second propulsion assembly, that is symmetrically disposed relative to the first propulsion assembly, to counteract the thrust vector error, thereby providing redundant directional control for the aircraft.

In certain embodiments, the flight control system may be a redundant flight control system or a triply redundant flight control system. In some embodiments, the commands of the flight control system to the second propulsion assembly may include tilting the second propulsion assembly about the first axis, tilting the second propulsion assembly about the second axis, changing the operating speed of the rotor assembly of the second propulsion assembly and combinations thereof. In certain embodiments, responsive to the thrust vector error of the first propulsion assembly, the flight control system may command at least two other propulsion assemblies to counteract the thrust vector error, thereby providing redundant directional control for the aircraft.

In some embodiments, when the thrust vector error of the first propulsion assembly is a static actuator fault causing the propulsion system of the first propulsion assembly to cease tilting about one axis, the flight control system may command the second propulsion assembly to counteract the single-axis static actuator fault. In certain embodiments, when the thrust vector error of the first propulsion assembly is a static actuator fault causing the propulsion system of the first propulsion assembly to cease tilting about both axes, the flight control system may command the second propulsion assembly to counteract the two-axis static actuator fault. In some embodiments, when the thrust vector error of the first propulsion assembly is a dynamic actuator fault causing the propulsion system of the first propulsion assembly to tilt uncontrolled about one axis, the flight control system may command the second propulsion assembly to counteract the single-axis dynamic actuator fault. In certain embodiments, when the thrust vector error of the first propulsion assembly is a dynamic actuator fault causing the propulsion system of the first propulsion assembly to tilt uncontrolled about both axes, the flight control system may command the second propulsion assembly to counteract the two-axis dynamic actuator fault.

In some embodiments, responsive to the thrust vector error of the first propulsion assembly, the flight control system may command the aircraft to land at a predetermined location, to perform an emergency landing, to continue a current mission, to adjust a center of mass of a payload relative to the airframe, to initiate a jettison sequence or some combination thereof. In certain embodiments, the aircraft may include at least four propulsion assemblies forming the two-dimensional thrust array. In some embodiments, the aircraft may have a thrust-borne flight mode and a wing-borne flight mode. In certain embodiments, the airframe may include first and second wings having at least first and second pylons extending therebetween and having a plurality of tail members extending therefrom, each tail member having a control surface. In some embodiments, the aircraft may include a pod assembly coupled to the airframe.

In a second aspect, the present disclosure is directed to an aircraft having a thrust-borne flight mode and a wing-borne flight mode. The aircraft includes an airframe having first and second wings with at least first and second pylons extending therebetween and with a plurality of tail members extending therefrom. A pod assembly is coupled to the airframe between the first and second pylons. A two-dimensional distributed thrust array is attached to the airframe. The thrust array includes at least four line replaceable propulsion units each of which is independently controlled by a flight control system. Each propulsion unit includes a housing with and a gimbal coupled thereto that is operable to tilt about first and second axes. First and second actuators are operable to tilt the gimbal respectively about the first and second axes. A propulsion system is coupled to and is operable to tilt with the gimbal. The propulsion system includes an electric motor having an output drive and a rotor assembly having a plurality of rotor blades. The rotor assembly is rotatable with the output drive of the electric motor in a rotational plane to generate thrust having a thrust vector. Responsive to a thrust vector error of a first propulsion assembly, the flight control system commands at least a second propulsion assembly, that is symmetrically disposed relative to the first propulsion assembly, to counteract the thrust vector error, thereby providing redundant directional control for the aircraft.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1B:
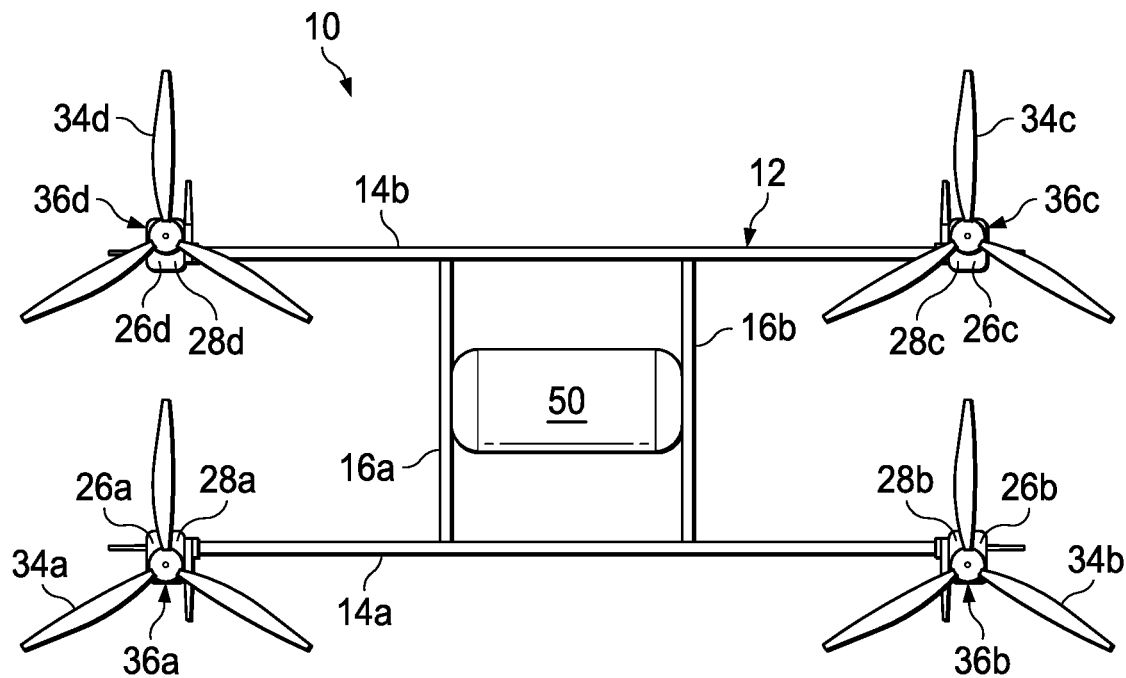
FIGS. 1A-1F are schematic illustrations of an aircraft in accordance with embodiments of the present disclosure.
Figure 1A:
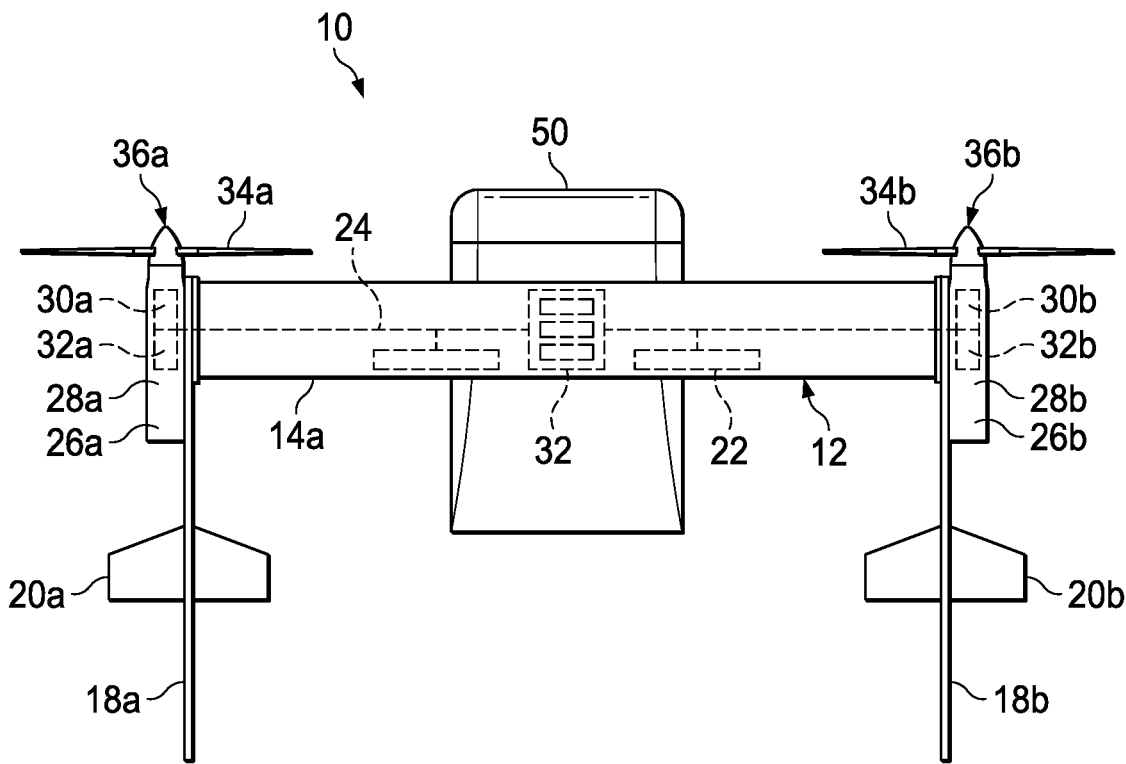
Figure 1D:
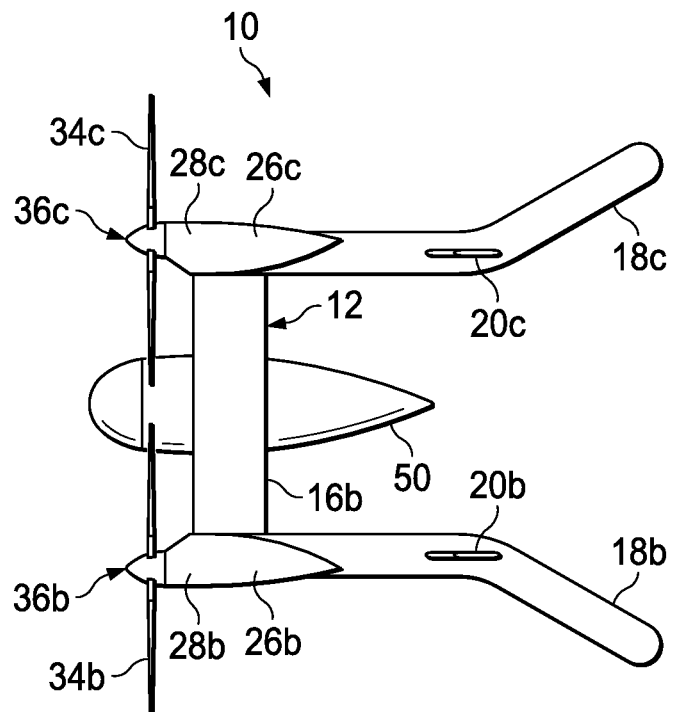
Figure 1C:
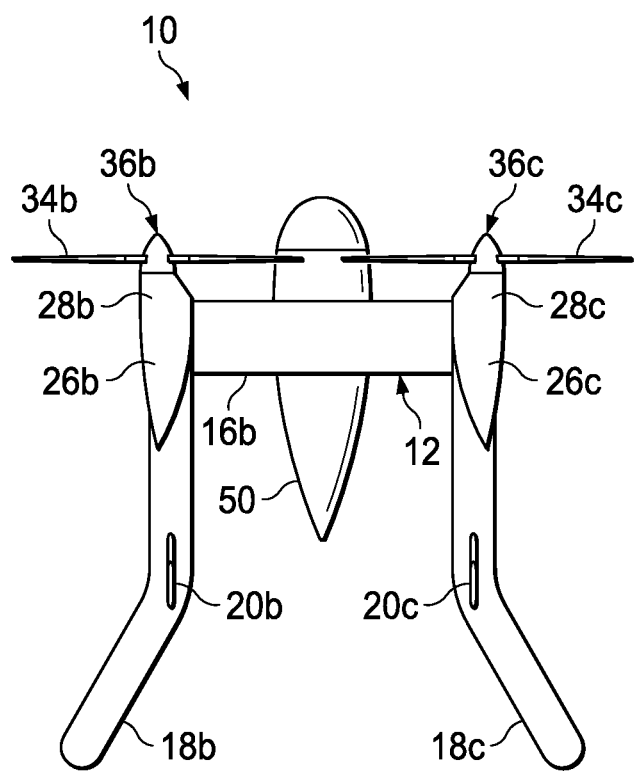
Figure 1F:
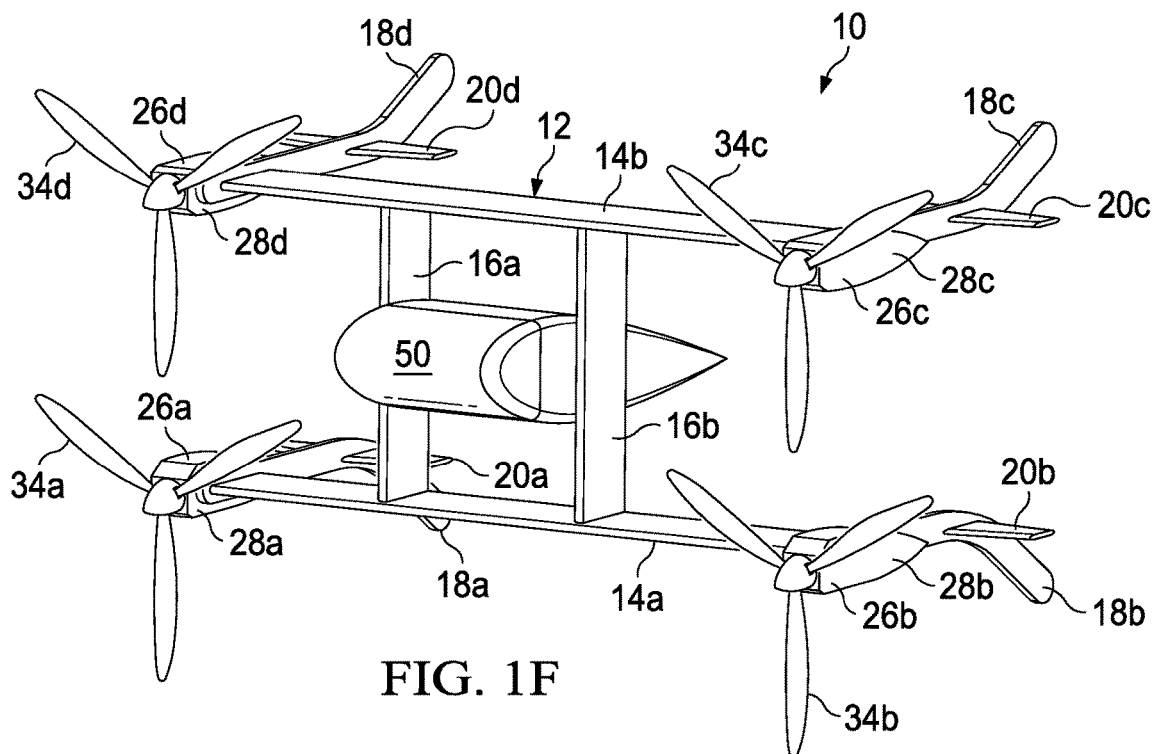
Figure 1E:
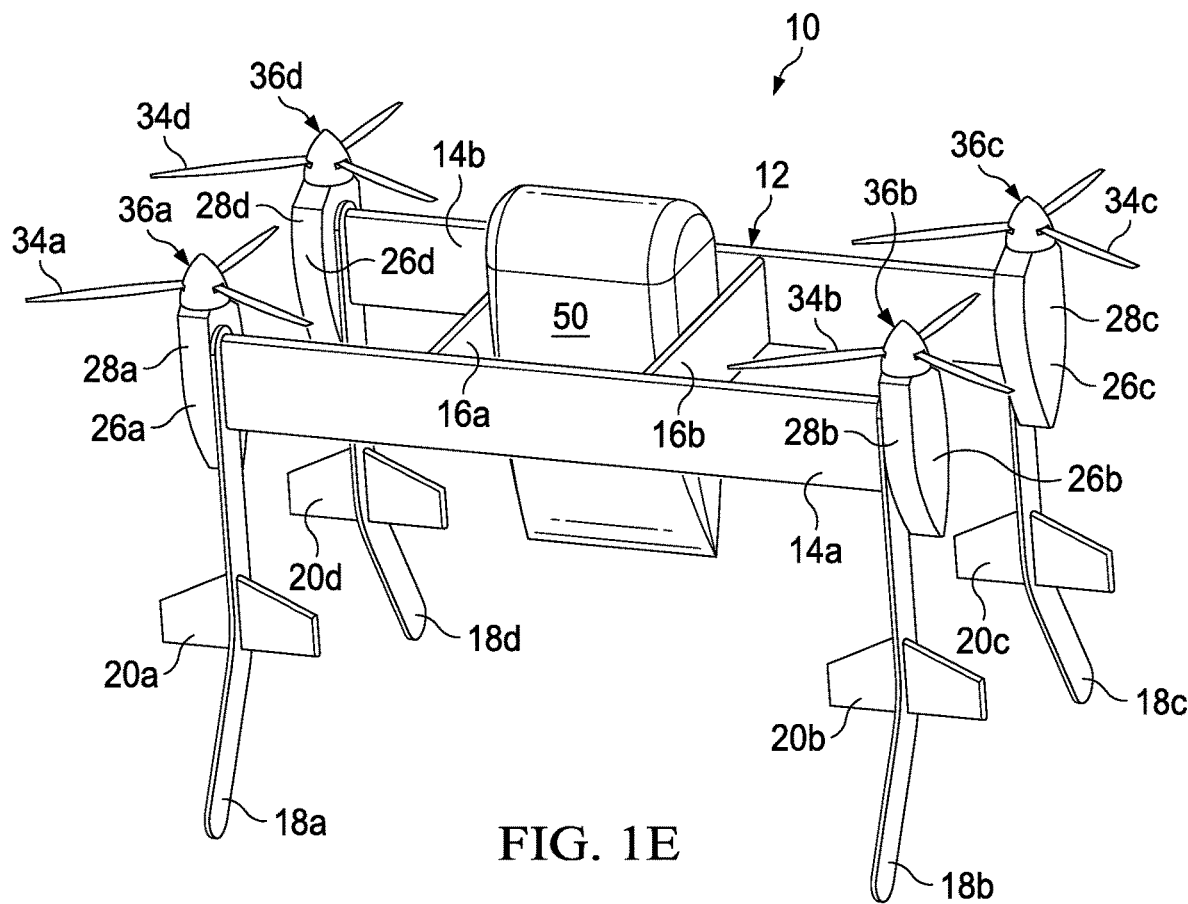

Referring to FIGS. 1A-1F in the drawings, various views of an aircraft 10 having a distributed thrust array including gimbal mounted propulsion systems operable for thrust vectoring are depicted. FIGS. 1A, 1C, 1E depict aircraft 10 in thrust-borne flight which may also be referred to as the vertical takeoff and landing or VTOL flight mode of aircraft 10. FIGS. 1B, 1D, 1F depict aircraft 10 in wing-borne flight which may also be referred to as the forward or high speed forward flight mode of aircraft 10. In the illustrated embodiment, the airframe 12 of aircraft 10 includes wings 14a, 14b each having an airfoil cross-section that generates lift responsive to the forward airspeed of aircraft 10. Wings 14a, 14b may be formed as single members or may be formed from multiple wing sections. The outer skins for wings 14a, 14b are preferably formed from high strength and lightweight materials such as fiberglass, carbon, plastic, metal or other suitable material or combination of materials. As illustrated, wings 14a, 14b are straight wings. In other embodiments, wings 14a, 14b could have other designs such as polyhedral wing designs, swept wing designs or other suitable wing design.

Extending generally perpendicularly between wings 14a, 14b are two truss structures depicted as pylons 16a, 16b. In other embodiments, more than two pylons may be present. Pylons 16a, 16b are preferably formed from high strength and lightweight materials such as fiberglass, carbon, plastic, metal or other suitable material or combination of materials. Wings 14a, 14b and pylons 16a, 16b may be coupled together at the respective intersections using mechanical connections such as bolts, screws, rivets, adhesives and/or other suitable joining technique. Extending generally perpendicularly from wings 14a, 14b are landing gear depicted as tail members 18a, 18b, 18c, 18d that enable aircraft 10 to operate as a tailsitting aircraft. In the illustrated embodiment, tail members 18a, 18b, 18c, 18d are fixed landing struts. In other embodiments, tail members 18a, 18b, 18c, 18d may include passively operated pneumatic landing struts or actively operated telescoping landing struts with or without wheels for ground maneuvers. Tail members 18a, 18b, 18c, 18d each include a control surface 20a, 20b, 20c, 20d, respectively, that may be passive or active aerosurfaces that serve as vertical stabilizers and/or elevators during wing-borne flight and serve to enhance hover stability during thrust-borne flight.

Wings 14a, 14b and pylons 16a, 16b preferably include central passageways operable to contain flight control systems, energy sources, communication lines and other desired systems. For example, as best seen in FIG. 1A, wing 14a houses the flight control system 32 of aircraft 10. Flight control system 32 is preferably a redundant digital flight control system. In the illustrated embodiment, flight control system 32 is a triply redundant digital flight control system including three independent flight control computers. Use of triply redundant flight control system 32 having redundant components improves the overall safety and reliability of aircraft 10 in the event of a failure in flight control system 32. Flight control system 32 preferably includes non-transitory computer readable storage media including a set of computer instructions executable by one or more processors for controlling the operation of aircraft 10. Flight control system 32 may be implemented on one or more general-purpose computers, special purpose computers or other machines with memory and processing capability. For example, flight control system 32 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 32 may be a microprocessor-based system operable to execute program code in the form of machine-executable instructions. In addition, flight control system 32 may be selectively connectable to other computer systems via a proprietary encrypted network, a public encrypted network, the Internet or other suitable communication network that may include both wired and wireless connections.

In the illustrated embodiment, wings 14a, 14b and/or pylons 16a, 16b may contain one or more of electrical power sources depicted as batteries 22 in wing 14a, as best seen in FIG. 1A. Batteries 22 supply electrical power to flight control system 32. In some embodiments, batteries 22 may be used to supply electrical power for the distributed thrust array of aircraft 10. Wings 14a, 14b and/or pylons 16a, 16b also contain a communication network 24 that enables flight control system 32 to communicate with the distributed thrust array of aircraft 10.

In the illustrated embodiment, the distributed thrust array includes four propulsion assemblies 26a, 26b, 26c, 26d that are independently operated and controlled by flight control system 32. It should be noted, however, that the distributed thrust array of the present disclosure could have any number of independent propulsion assemblies including six, eight, twelve, sixteen or other number of independent propulsion assemblies. Propulsion assemblies 26a, 26b, 26c, 26d are independently attachable to and detachable from airframe 12. For example, propulsion assemblies 26a, 26b, 26c, 26d are preferably standardized and interchangeable units that are most preferably line replaceable propulsion units enabling easy installation and removal from airframe 12. Propulsion assemblies 26a, 26b, 26c, 26d may be coupled to wings 14a, 14b using quick connect and disconnect couplings techniques including bolts, pins, cables or other suitable coupling techniques. In addition, the use of line replaceable propulsion units is beneficial in maintenance situations if a fault is discovered with one of the propulsion units. In this case, the faulty propulsion unit can be decoupled from airframe 12 by simple operations and another propulsion unit can then be attached to airframe 12. In other embodiments, propulsion assemblies 26a, 26b, 26c, 26d may be permanently coupled to wings 14a, 14b by riveting, bonding and/or other suitable technique.

As illustrated, propulsion assemblies 26a, 26b, 26c, 26d are coupled to the outboard ends of wings 14a, 14b. In other embodiments, propulsion assemblies 26a, 26b, 26c, 26d could have other configurations including close coupled configurations, high wing configurations, low wing configurations or other suitable configuration. In the illustrated embodiment, the four independently operating propulsion assemblies 26a, 26b, 26c, 26d form a two-dimensional thrust array with each of the propulsion assemblies having a symmetrically disposed propulsion assembly. For example, propulsion assemblies 26a, 26c are symmetrically disposed propulsion assemblies and propulsion assemblies 26b, 26d are symmetrically disposed propulsion assemblies. It should be noted, however, that a two-dimensional thrust array of the present disclosure could have any number of independent propulsion assemblies including six, eight, twelve, sixteen or other number of independent propulsion assemblies that form the two-dimensional thrust array with each of the propulsion assemblies having a symmetrically disposed propulsion assembly.

In the illustrated embodiment, each propulsion assembly 26a, 26b, 26c, 26d includes a housing 28a, 28b, 28c, 28d, that contains components such as an electric motor, a gimbal, one or more actuators and an electronics node including, for example, batteries, controllers, sensors and other desired electronic equipment. Only electric motors 30a, 30b and electronics nodes 32a, 32b are visible in FIG.

1A. The electric motors of each propulsion assembly 26a, 26b, 26c, 26d are preferably operated responsive to electrical energy from the battery or batteries disposed with that housings, thereby forming a distributed electrically powered thrust array. Alternatively or additionally, electrical power may be supplied to the electric motors and/or the batteries disposed with the housing from batteries 22 carried by airframe 12 via communications network 24. In other embodiments, the propulsion assemblies may include internal combustion engines or hydraulic motors.

Flight control system 32 communicates via communications network 24 with the electronics nodes of each propulsion assembly 26a, 26b, 26c, 26d, such as electronics node 32a of propulsion assembly 26a and electronics node 32b of propulsion assembly 26b. Flight control system 32 receives sensor data from and sends flight command information to the electronics nodes of each propulsion assembly 26a, 26b, 26c, 26d such that each propulsion assembly 26a, 26b, 26c, 26d may be individually and independently controlled and operated. For example, flight control system 32 is operable to individually and independently control the operating speed and thrust vector of each propulsion assembly 26a, 26b, 26c, 26d. Flight control system 32 may autonomously control some or all aspects of flight operation for aircraft 10. Flight control system 32 is also operable to communicate with remote systems, such as a ground station via a wireless communications protocol. The remote system may be operable to receive flight data from and provide commands to flight control system 32 to enable remote flight control over some or all aspects of flight operation for aircraft 10. The autonomous and/or remote operation of aircraft 10 enables aircraft 10 to perform unmanned logistic operations for both military and commercial applications.

Each propulsion assembly 26a, 26b, 26c, 26d includes a rotor assembly 34a, 34b, 34c, 34d. Each rotor assembly 34a, 34b, 34c, 34d is directly or indirectly coupled to an output drive of a respective electrical motor 30a, 30b, 30c, 30d that rotates the rotor assembly 34a, 34b, 34c, 34d in a rotational plane to generate thrust for aircraft 10. In the illustrated embodiment, rotor assemblies 34a, 34b, 34c, 34d each include three rotor blades having a fixed pitch. In other embodiments, the rotor assemblies could have other numbers of rotor blades both less than and greater than three. Alternatively or additionally, the rotor assemblies could have variable pitch rotor blades with collective and/or cyclic pitch control. Each electrical motor 30a, 30b, 30c, 30d is paired with a rotor assembly 34a, 34b, 34c, 34d, for example electrical motor 30a and rotor assembly 34a, to form a propulsion system 36a, 36b, 36c, 36d. As described herein, each propulsion system 36a, 36b, 36c, 36d may have a single-axis or a two-axis tilting degree of freedom relative to housings 28a, 28b, 28c, 28d and thus airframe 12 such that propulsion systems 36a, 36b, 36c, 36d are operable for thrust vectoring. In the illustrated embodiment, the maximum angle of the thrust vector may preferably be between about 10 degrees and about 30 degrees, may more preferably be between about 15 degrees and about 25 degrees and may most preferably be about 20 degrees. Notably, using a 20-degree thrust vector yields a lateral component of thrust that is about 34 percent of total thrust. In other embodiments, the propulsion systems may not have a tilting degree of freedom in which case, propulsion systems 36a, 36b, 36c, 36d may not be capable of thrust vectoring. As such, aircraft 10 may have no thrust vectoring capabilities, single-axis thrust vectoring capabilities or two-axis thrust vectoring capabilities associated with each propulsion assembly 26a, 26b, 26c, 26d.

Aircraft 10 may operate as a transport aircraft for a pod assembly 50 that is fixed to or selectively attachable to and detachable from airframe 12. In the illustrated embodiment, pylons 16a, 16b include receiving assemblies for coupling with pod assembly 50. The connection between pylons 16a, 16b and pod assembly 50 may be a fixed connection that secures pod assembly 50 in a single location relative to airframe 12. Alternatively, pod assembly 50 may be allowed to rotate and/or translate relative to airframe 12 during ground and/or flight operations. For example, it may be desirable to have pod assembly 50 low to the ground for loading and unloading cargo but more distant from the ground for takeoff and landing. As another example, it may be desirable to change the center of mass of pod assembly 50 relative to airframe 12 during certain flight conditions such as moving the center of mass of pod assembly 50 forward relative to airframe 12 during high speed wing-borne flight. Similarly, it may be desirable to lowering the center of mass of pod assembly 50 relative to airframe 12 during hover in the event of a partial or total failure of one of the propulsion assemblies. As illustrated, pod assembly 50 may be selectively coupled to and decoupled from airframe 12 to enable sequential pickup, transportation and delivery of multiple pod assemblies 50 to and from multiple locations.

Airframe 12 preferably has remote release capabilities of pod assembly 50. For example, this feature allows airframe 12 to drop pod assembly 50 at a desire location following transportation. In addition, this feature allows airframe 12 to jettison pod assembly 50 during flight, for example, in the event of an emergency situation such as a propulsion assembly or other system of aircraft 10 becoming compromised. One or more communication channels may be established between pod assembly 50 and airframe 12 when pod assembly 50 is attached therewith. A quick disconnect harness may be coupled between pod assembly 50 and airframe 12 such that flight control system 32 may send commands to pod assembly 50 to perform functions. For example, flight control system 32 may operate doors of pod assembly 50 between open and closed positions to enable loading and unloading of a payload to be transported within pod assembly 50.

Figure 2A:
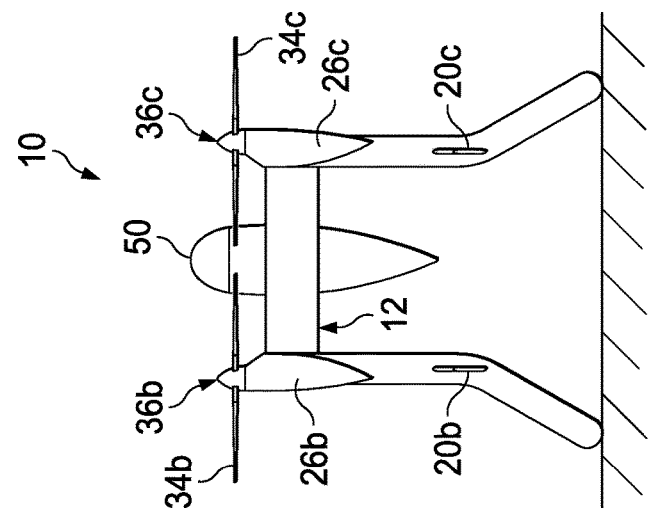
FIGS. 2A-2I are schematic illustrations of an aircraft in a sequential flight operating scenario in accordance with embodiments of the present disclosure.

Referring additionally to FIGS. 2A-2I in the drawings, a sequential flight-operating scenario of aircraft 10 is depicted. In the illustrated embodiment, pod assembly 50 is attached to airframe 12 and may contain a desired payload. It is noted, however, that pod assembly 50 may be selectively disconnected from airframe 12 such that a single airframe can be operably coupled to and decoupled from numerous pod assemblies for numerous missions over time. In addition, aircraft 10 may perform missions without having a pod assembly attached to airframe 12. As best seen in FIG. 2A, aircraft 10 is in a tailsitting position on the ground. When aircraft 10 is ready for a mission, flight control system 32 commences operations to provide flight control to aircraft 10 which may be autonomous flight control, remote flight control or a combination thereof. For example, it may be desirable to utilize remote flight control during certain maneuvers such as takeoff and landing but rely on autonomous flight control during hover, high speed forward flight and/or transitions between wing-borne flight and thrust-borne flight.

Figure 2B:
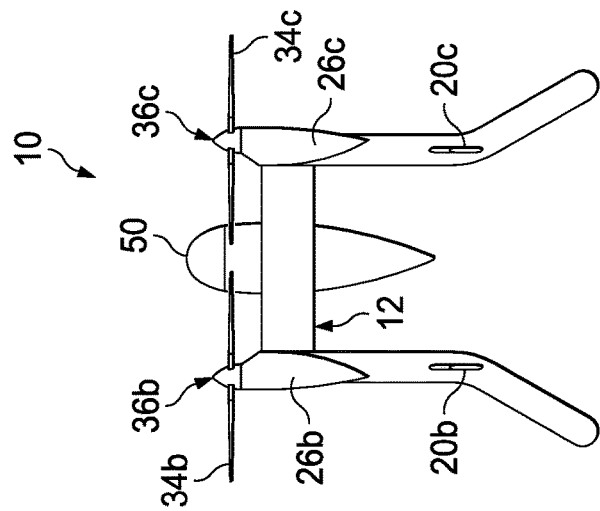
Figure 2C:
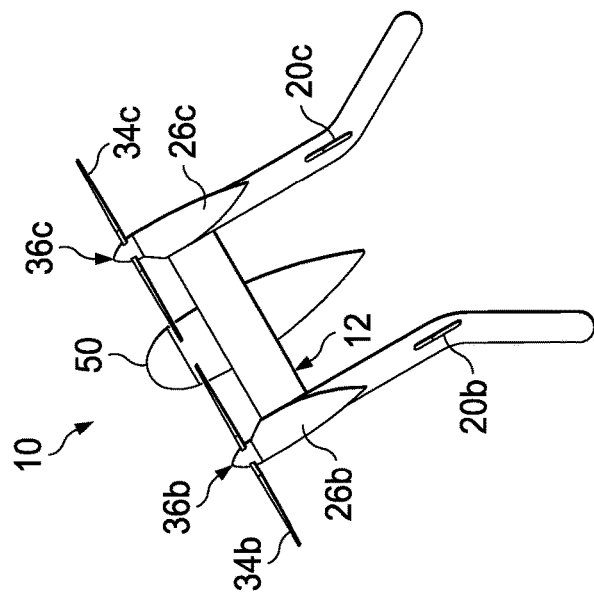
Figure 2D:
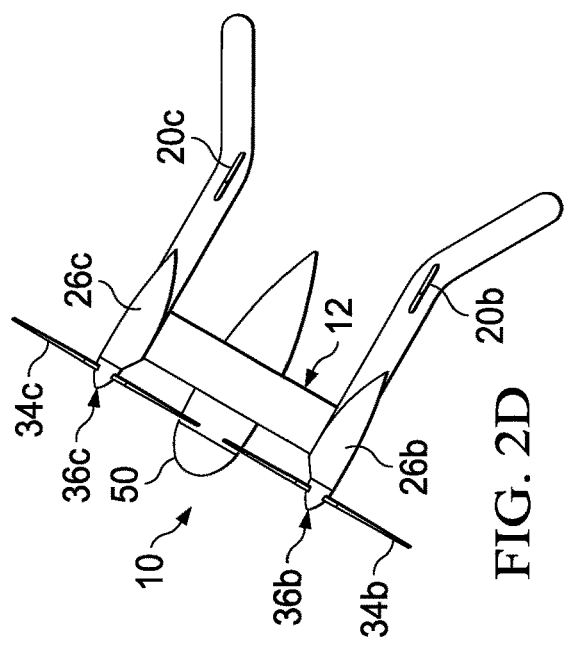

As best seen in FIG. 2B, aircraft 10 has performed a vertical takeoff and is engaged in thrust-borne flight with pod assembly 50 lifted into the air. As illustrated, the rotor assemblies 34a, 34b, 34c, 34d are each rotating in the same horizontal plane forming of a two-dimensional distributed thrust array. As noted, flight control system 32 independently controls and operates each propulsion assembly 26a, 26b, 26c, 26d including independently controlling operating speeds and thrust vectors. During hover, flight control system 32 may utilize differential speed control of rotor assemblies 34a, 34b, 34c, 34d for stabilizing aircraft 10 and for providing yaw authority. This may be achieved by increasing the speed of the rotor assemblies rotating clockwise, such as rotor assemblies 34a, 34c and/or decreasing the speed of the rotor assemblies rotating counter clockwise, such as rotor assemblies 34b, 34d.

Alternatively or additional, flight control system 32 may utilize differential thrust vectoring of propulsion systems 36a, 36b, 36c, 36d for stabilizing aircraft 10 and for providing yaw authority. This may be achieved by differential longitudinal thrust vectoring of two symmetrically disposed propulsion systems such as propulsion systems 36a, 36c. This may also be achieved by differential thrust vectoring of all propulsion systems 36a, 36b, 36c, 36d by suitably clocking the thrust vectors at approximately 90 degrees from one another. Alternatively or additional, flight control system 32 may utilize differential control surface maneuvers of control surfaces 20a, 20b, 20c, 20d for stabilizing aircraft 10 and for providing yaw authority. This may be achieved by differential longitudinal control surface maneuvers of two symmetrically disposed control surfaces such as control surfaces 20a, 20c.

In embodiments of aircraft 10 having two-axis thrust vectoring capabilities associated with each propulsion assembly 26a, 26b, 26c, 26d, aircraft 10 has redundant direction control during hover which serves as a safety feature in the event of a partial or complete failure in one propulsion assembly. As discussed herein, flight control system 32 is operable to send commands to a symmetrically disposed propulsion assembly to counteract a thrust vector error in the compromised propulsion assembly. Alternatively or additional, flight control system 32 is operable to send commands to any one or all of the other propulsion assemblies to counteract a thrust vector error in the compromised propulsion assembly. This feature improves the overall safety of aircraft 10 and provides redundant direction control to aircraft 10.

After vertical assent to the desired elevation, aircraft 10 may begin the transition from thrust-borne flight to wing-borne flight. As best seen from the progression of FIGS. 2B-2E, aircraft 10 is operable to pitch forward from thrust-borne flight to wing-borne flight to enable high speed and/or long range forward flight. Flight control system 32 may achieve this operation by increasing the speed of rotor assemblies 34c, 34d and/or decreasing the speed of rotor assemblies 34a, 34b, collective thrust vectoring of propulsion systems 36a, 36b, 36c, 36d, collective control surface maneuvers of control surfaces 20a, 20b, 20c, 20d or any combination thereof.

Figure 2E:
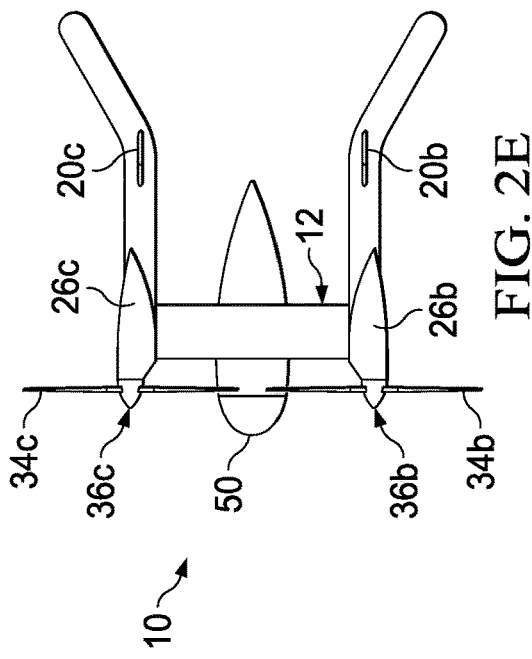
Figure 2F:
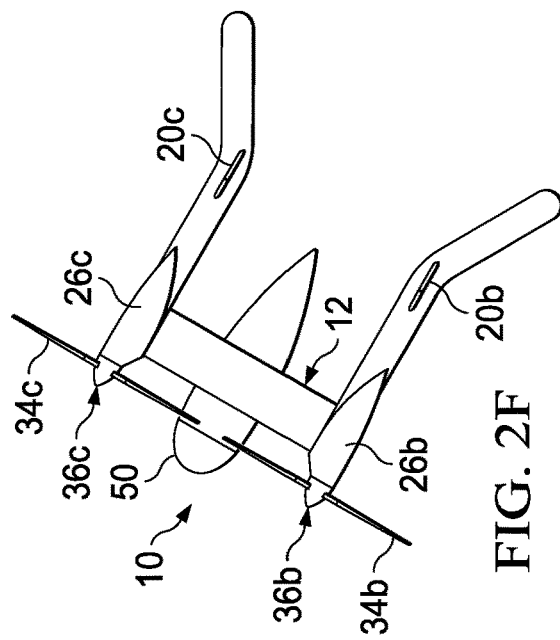

As best seen in FIG. 2E, rotor assemblies 34a, 34b, 34c, 34d are each rotating in the same vertical plane forming of a two-dimensional distributed thrust array. As wing-borne forward flight requires significantly less power then thrust-borne vertical flight, the operating speed of some or all of propulsion assembly 26a, 26b, 26c, 26d may be reduced. In certain embodiments, some of the propulsion assemblies of an aircraft of the present disclosure could be shut down during wing-borne forward flight. In forward flight mode, the independent control of flight control system 32 over each propulsion assembly 26a, 26b, 26c, 26d provides pitch, roll and yaw authority using, for example, collective or differential thrust vectoring, differential speed control, collective or differential control surface maneuvers or any combination thereof. In addition, as in thrust-borne vertical flight, when aircraft 10 is engaged in wing-borne forward flight, flight control system 32 is operable to send commands to a symmetrically disposed propulsion assembly or multiple other propulsion assemblies to counteract an error in one of the propulsion assemblies.

Figures 2G, 2H, 2I:
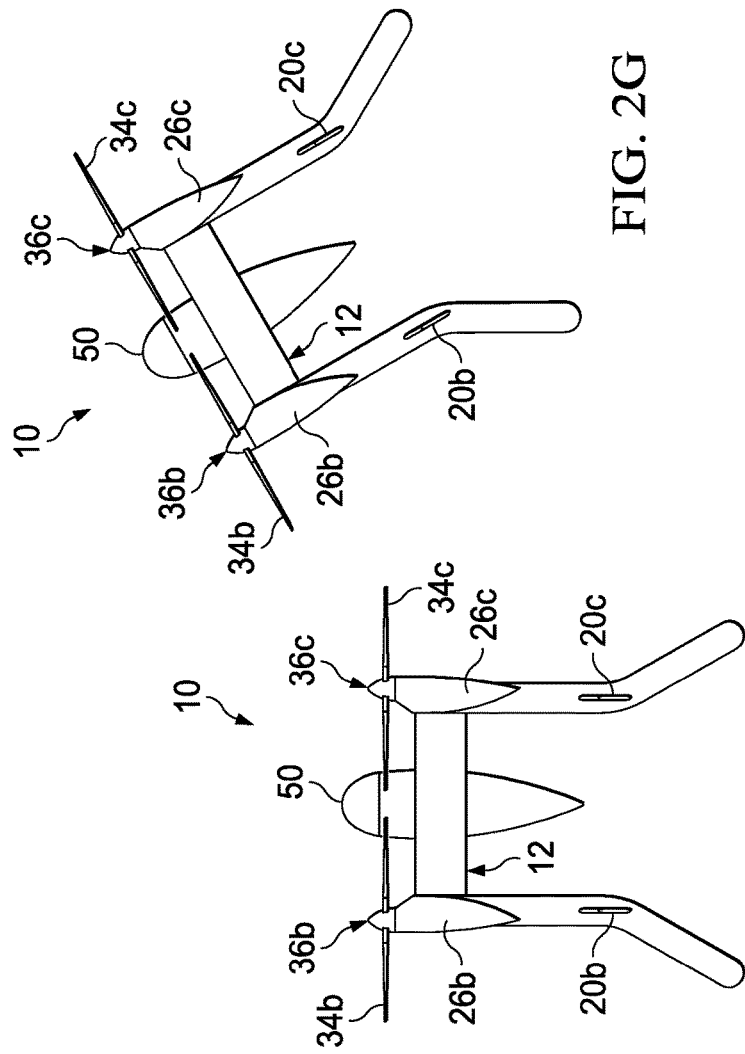

As aircraft 10 approaches its destination, aircraft 10 may begin its transition from wing-borne flight to thrust-borne flight. As best seen from the progression of FIGS. 2E-2H, aircraft 10 is operable to pitch aft from wing-borne flight to thrust-borne flight to enable, for example, a vertical landing operation. Flight control system 32 may achieve this operation by increasing the speed of rotor assemblies 34a, 34b and/or decreasing the speed of rotor assemblies 34c, 34d, collective thrust vectoring of propulsion systems 36a, 36b, 36c, 36d, collective control surface maneuvers of control surfaces 20a, 20b, 20c, 20d or any combination thereof. Once aircraft 10 has completed the transition to thrust-borne vertical flight, aircraft 10 may commence its vertical descent to a surface. As best seen in FIG. 2I, aircraft 10 has landing in a tailsitting orientation at the destination location and may, for example, remotely drop a payload carried within pod assembly 50.

Figure 3:
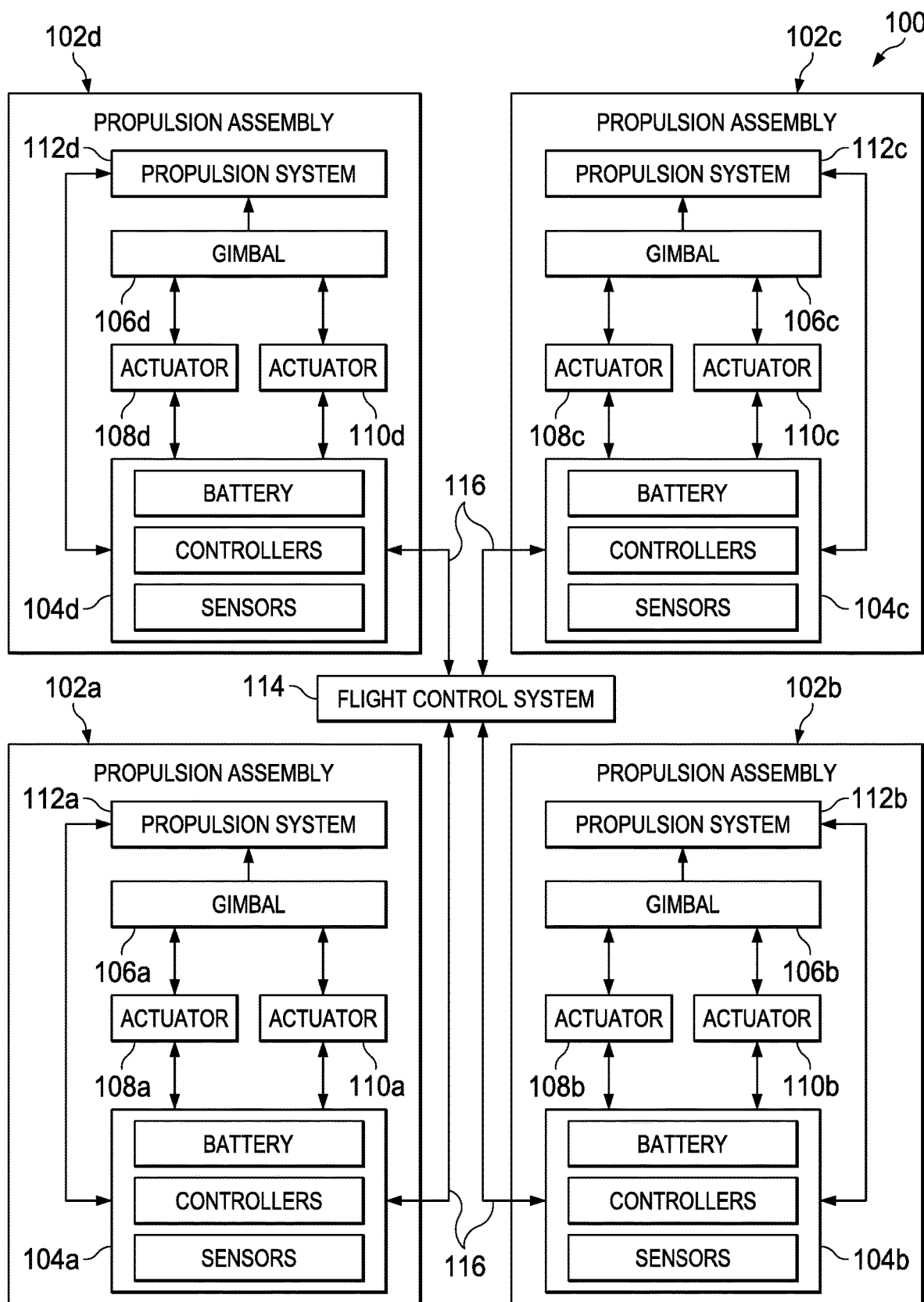
FIG. 3 is a block diagram of a two-dimensional distributed thrust array having two-axis gimbal mounted propulsion systems for an aircraft in accordance with embodiments of the present disclosure.

Referring next to FIG. 3, the redundant directional control feature of an aircraft 100 having a distributed thrust array including two-axis gimbal mounted propulsion systems will now be described. Aircraft 100 includes a distributed thrust array depicted as four propulsion assemblies 102a, 102b, 102c, 102d forming a two-dimensional thrust array. Propulsion assembly 102a includes electronics node 104a, two-axis gimbal 106a operated by actuators 108a, 110a and propulsion system 112a. Propulsion assembly 102b includes electronics node 104b, two-axis gimbal 106b operated by actuators 108b, 110b and propulsion system 112b. Propulsion assembly 102c includes electronics node 104c, two-axis gimbal 106c operated by actuators 108c, 110c and propulsion system 112c. Propulsion assembly 102d includes electronics node 104d, two-axis gimbal 106d operated by actuators 108d, 110d and propulsion system 112d. Each of electronics nodes 104a, 104b, 104c, 104d includes one or more batteries, one or more controllers such as an electronic speed controller and one or more sensors for monitoring parameters associate with the components of the respective propulsion assembly. As discussed herein, each of propulsion systems 112a, 112b, 112c, 112d includes an electric motor having an output drive and a rotor assembly having a plurality of rotor blades. Each rotor assembly is rotatable with the respective output drive of the electric motor in a rotational plane to generate thrust. A flight control system 114 is operably associated with propulsion assemblies 102a, 102b, 102c, 102d and is communicably linked to electronic nodes 104a, 104b, 104c, 104d by communications network 116. Flight control system 114 receives sensor data from and send commands to electronic nodes 104a, 104b, 104c, 104d to enable flight control system 114 to independently control each of propulsion assemblies 102a, 102b, 102c, 102d.

Figure 4B:
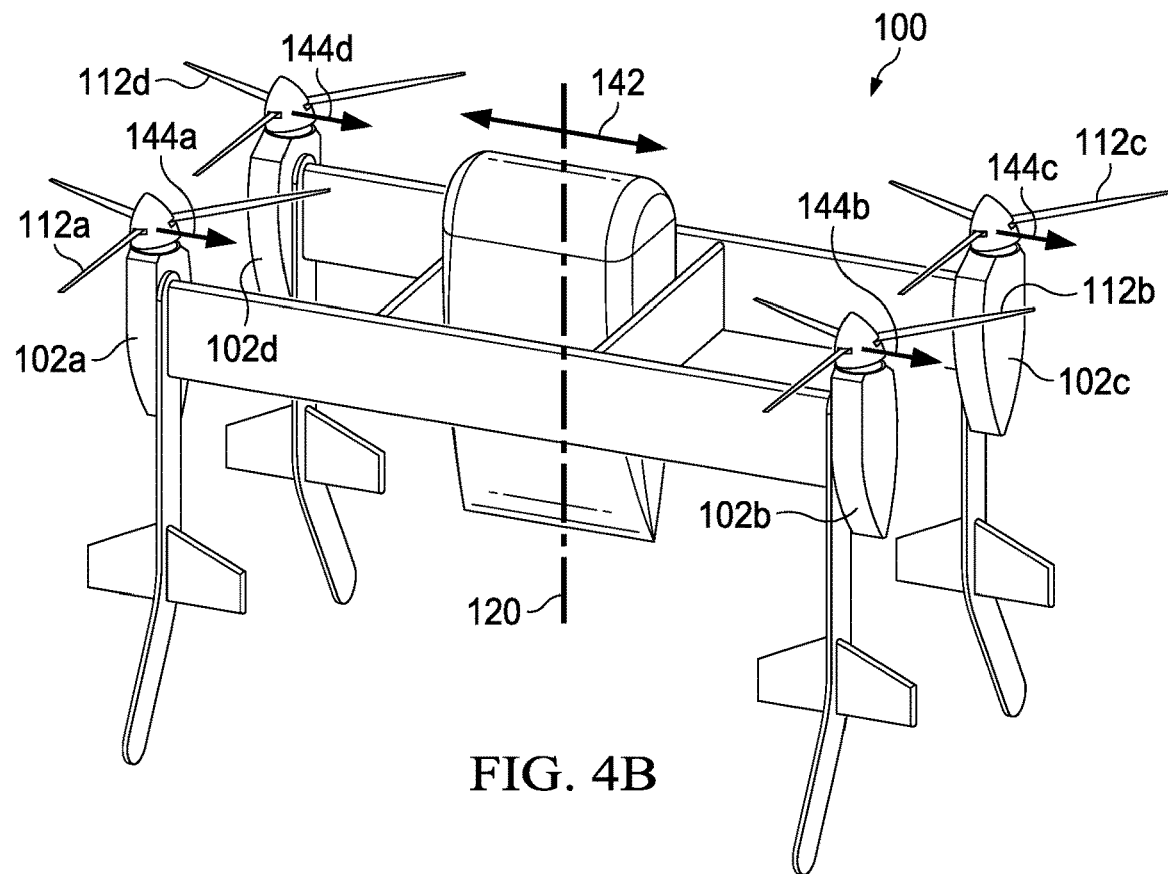
FIGS. 4A-4D are schematic illustrations of an aircraft performing various flight maneuvers in accordance with embodiments of the present disclosure.
Figure 4A:
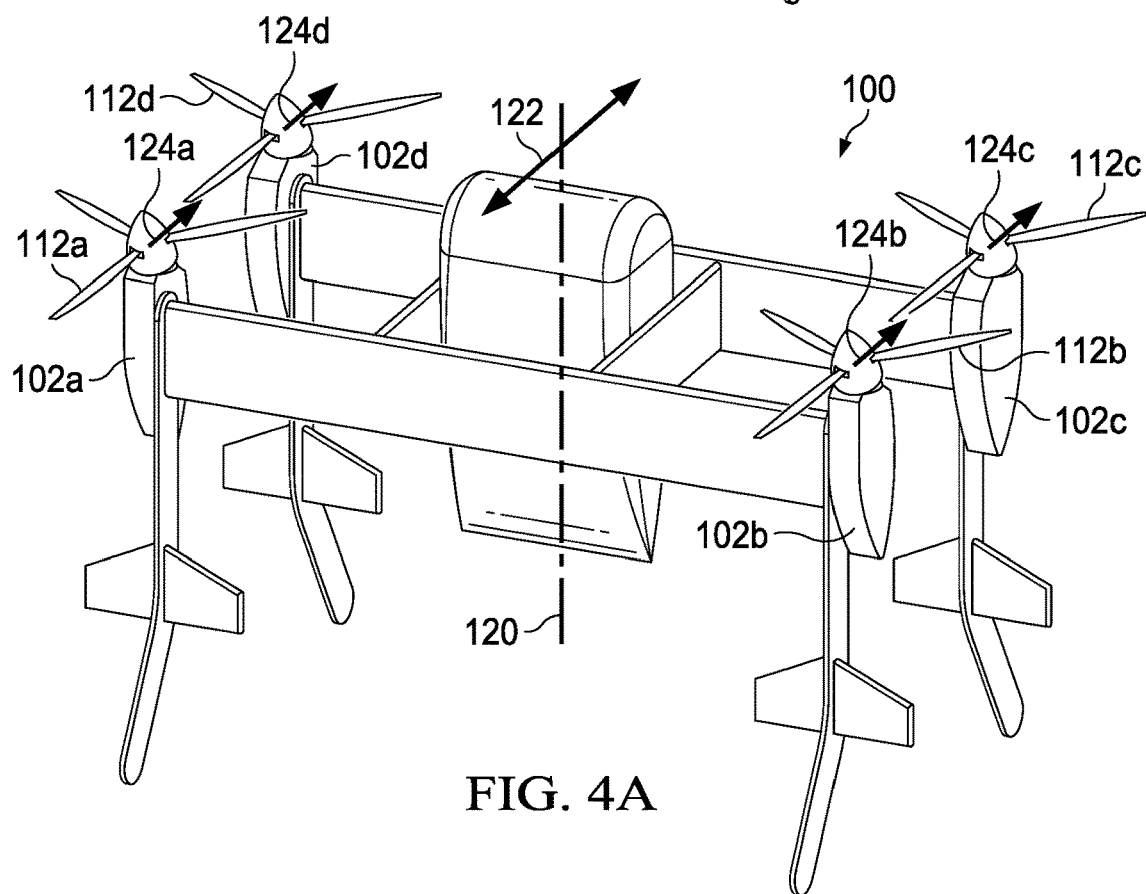

For example, as best seen in FIG. 4A, aircraft 100 has longitudinal control authority responsive to collective thrust vectoring of propulsion assemblies 102a, 102b, 102c, 102d. As illustrated, aircraft 100 has a longitudinal axis 120 and is operable for movement in the longitudinal direction as indicated by arrow 122. In the illustrated embodiment, flight control system 114 has sent commands to operate each of actuators 108a, 108b, 108c, 108d to tilt each of propulsion systems 112a, 112b, 112c, 112d in the forward direction. Actuators 110a, 110b, 110c, 110d are in an unactuated state.

In this configuration, propulsion assemblies 102a, 102b, 102c, 102d generate thrust vectors having aftward directed longitudinal components 124a, 124b, 124c, 124d. In hover, such collective thrust vectoring of propulsion assemblies 102a, 102b, 102c, 102d provides longitudinal control authority to aircraft 100.

The longitudinal thrust vectoring operation will now be described with reference to an exemplary propulsion assembly 102, depicted as a line replaceable propulsion unit, in FIGS. 5A-5C. Propulsion assembly 102 includes a housing 126 and a gimbal 106 that is coupled to housing 126. Gimbal 106 includes an outer gimbal member 128 and an inner gimbal member 130. Outer gimbal member 128 is pivotally coupled to housing 126 and is operable to tilt about a first axis. Inner gimbal member 130 is pivotally coupled to outer gimbal member 128 and is operable to tilt about a second axis that is orthogonal to the first axis. In the illustrated embodiment, actuator 108 is coupled between housing 126 and outer gimbal member 128 such that operation of actuator 108 shift linkage 132 to tilt outer gimbal member 128 about the first axis relative to housing 126. Actuator 110 is coupled between housing 126 and inner gimbal member 130 such that operation of actuator 110 shifts linkage 134 to tilt inner gimbal member 130 about the second axis relative to outer gimbal member 128 and housing 126. A propulsion system 112 is coupled to and is operable to tilt with gimbal 106 about both axes relative to housing 126. In the illustrated embodiment, the rotor assembly has been removed from propulsion system 112 such that only electric motor 136 and output drive 138 are visible in the figures.

Figure 5A:
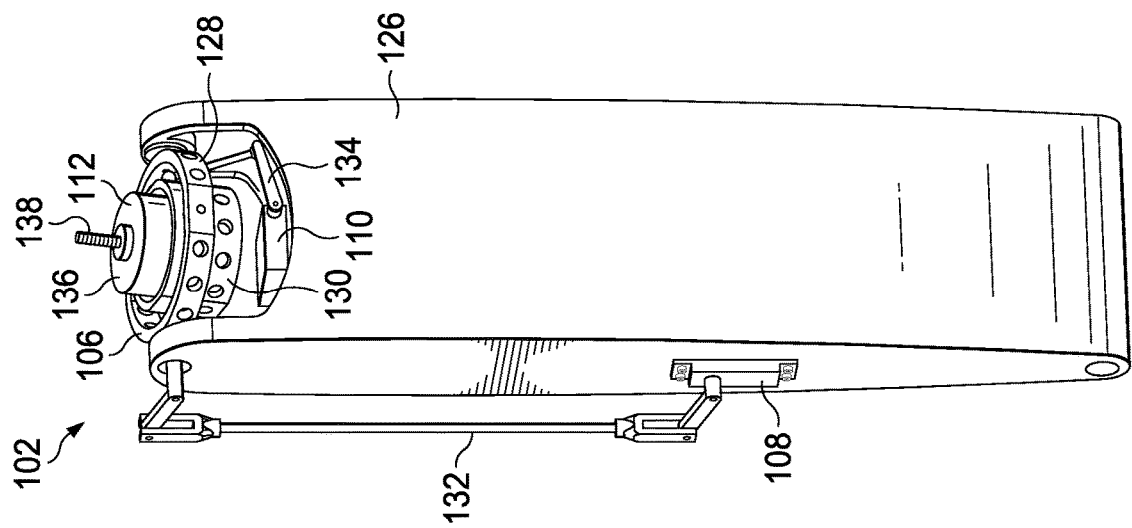
FIGS. 5A-5I are schematic illustrations of a line replaceable propulsion unit operating a two-axis gimbal for an aircraft in accordance with embodiments of the present disclosure.
Figure 5B:
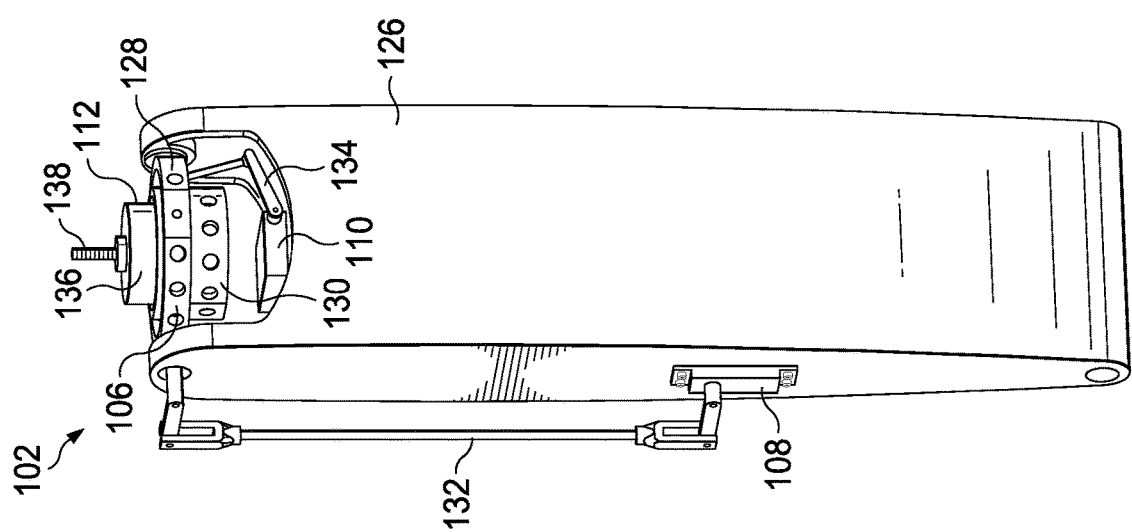
Figure 5C:
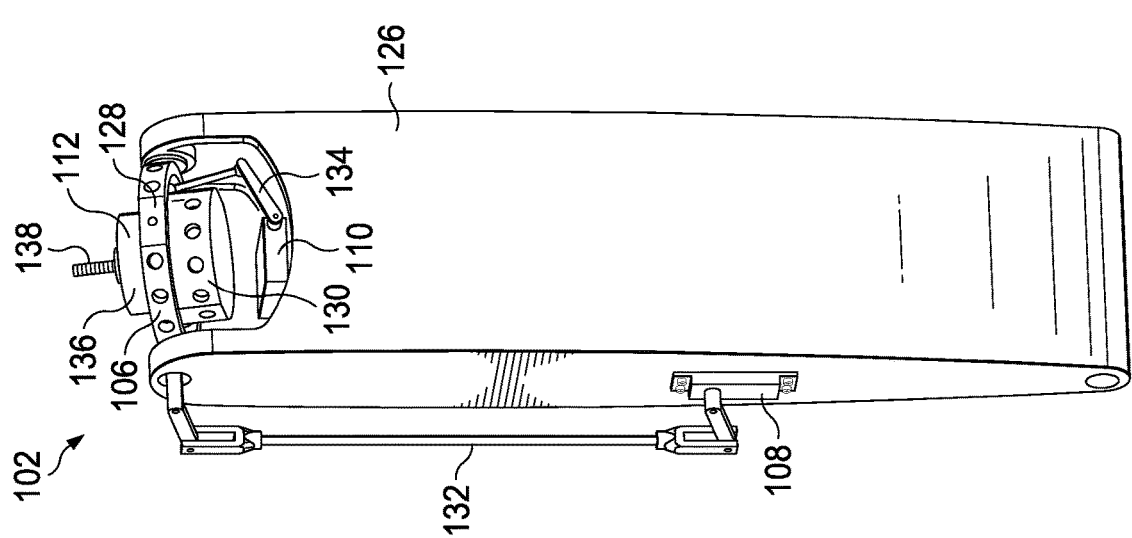

As best seen in the comparison of FIGS. 5A-5C, actuator 108 is operated to tilt propulsion system 112 longitudinally between a fully forward configuration shown in FIG. 5A and a fully aft configuration shown in FIG. 5C as well as in an infinite number of positions therebetween including the fully vertical configuration shown in FIG. 5B. This operation longitudinally shifts the thrust vector of propulsion assembly 102 to enable the longitudinal control authority of aircraft 100 depicted in FIG. 4A. The maximum longitudinal tilt angle of gimbal 106 may preferably be between about 10 degrees and about 30 degrees, may more preferably be between about 15 degrees and about 25 degrees and may most preferably be about 20 degrees. As should be understood by those having ordinary skill in the art, the magnitude of the longitudinal component 124 of the thrust vector is related to the direction of the thrust vector, which is determined by the longitudinal tilt angle of gimbal 106.

As best seen in FIG. 4B, aircraft 100 has lateral control authority responsive to collective thrust vectoring of propulsion assemblies 102a, 102b, 102c, 102d. As illustrated, aircraft 100 has a longitudinal axis 120 and is operable for movement in the lateral direction as indicated by arrow 142. In the illustrated embodiment, flight control system 114 has sent commands to operate each of actuators 110a, 110b, 110c, 110d to tilt each of propulsion systems 112a, 112b, 112c, 112d to the right (from a forward looking perceptive from longitudinal axis 120). Actuators 108a, 108b, 108c, 108d are in an unactuated state. In this configuration, propulsion assemblies 102a, 102b, 102c, 102d generate thrust vectors having leftwardly directed lateral components 144a, 144b, 144c, 144d. In hover, such collective thrust vectoring of propulsion assemblies 102a, 102b, 102c, 102d provides lateral control authority to aircraft 100.

Figure 5D:
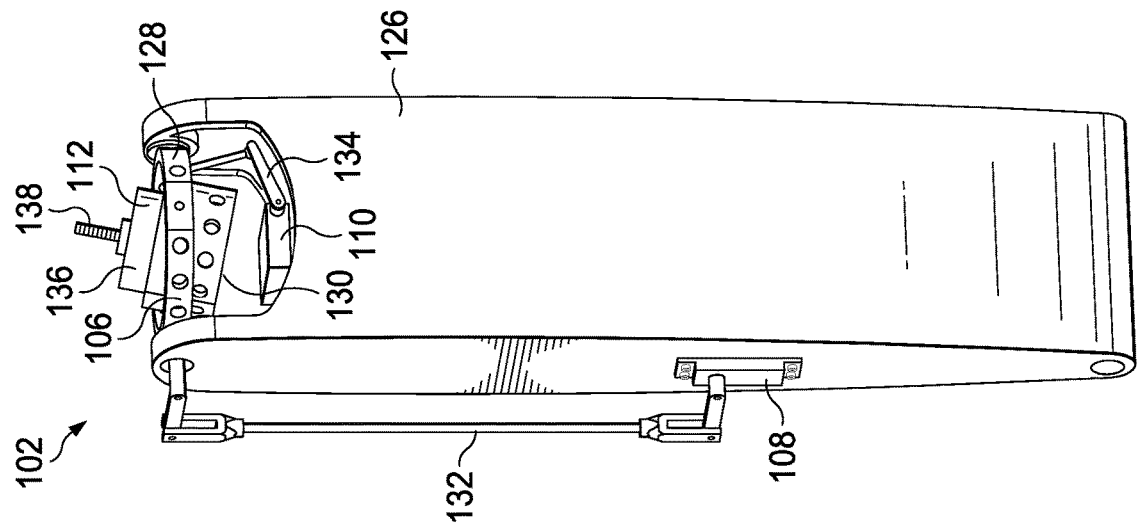
Figure 5E:
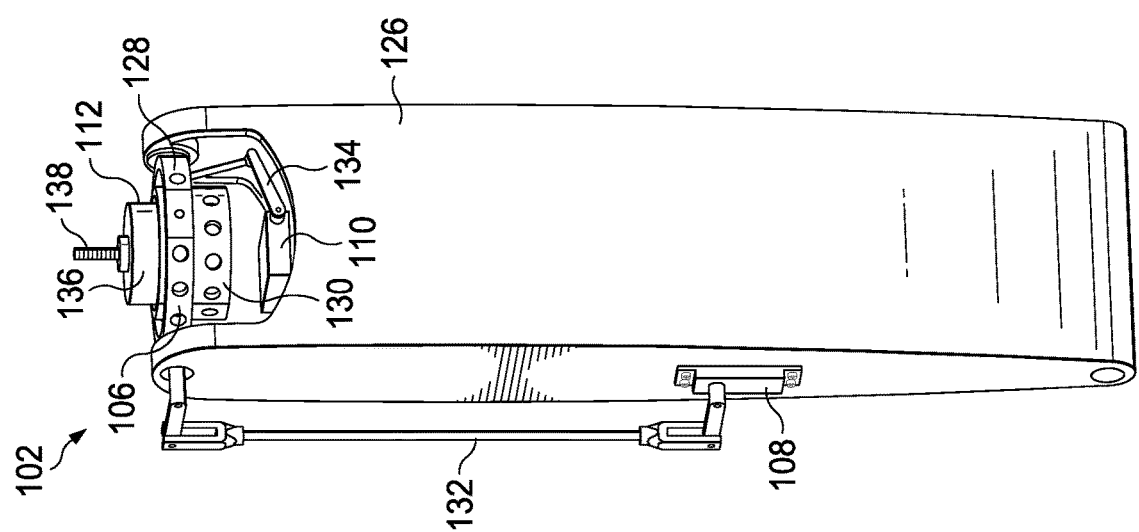
Figure 5F:
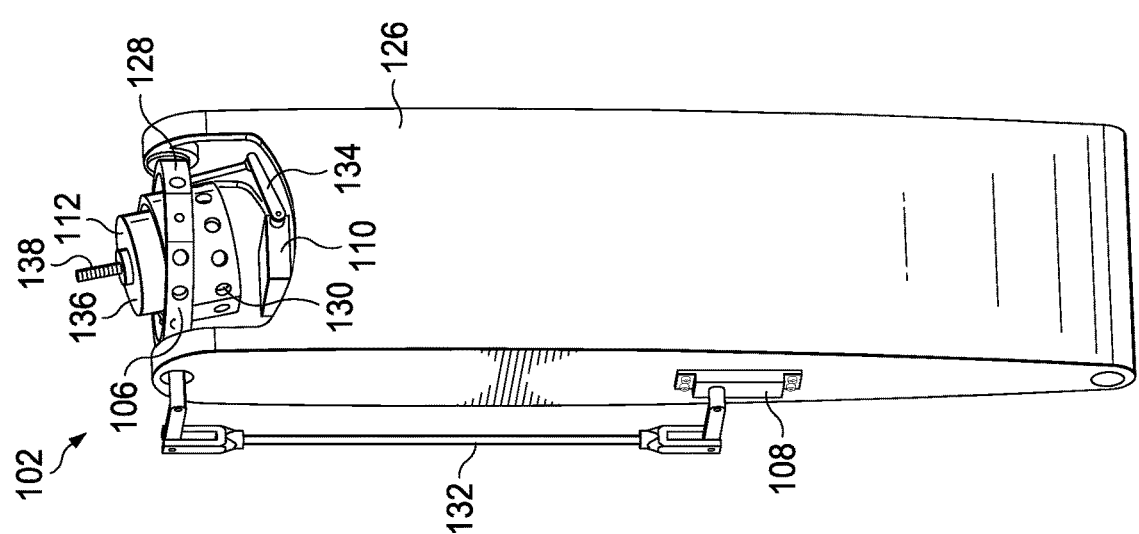

The lateral thrust vectoring operation will now be described with reference to propulsion assembly 102 in FIGS. 5D-5F. As best seen in the comparison of FIGS. 5D-5F, actuator 110 is operated to tilt propulsion system 112 lateral between a fully right configuration shown in FIG. 5D and a fully left configuration shown in FIG. 5F as well as in an infinite number of positions therebetween including the fully vertical configuration shown in FIG. 5E. This operation laterally shifts the thrust vector of propulsion assembly 102 to enable the lateral control authority of aircraft 100 depicted in FIG. 4B. The maximum lateral tilt angle of gimbal 106 may preferably be between about 10 degrees and about 30 degrees, may more preferably be between about 15 degrees and about 25 degrees and may most preferably be about 20 degrees. As should be understood by those having ordinary skill in the art, the magnitude of the lateral component 144 of the thrust vector is related to the direction of the thrust vector, which is determined by the lateral tilt angle of gimbal 106.

Figure 4D:
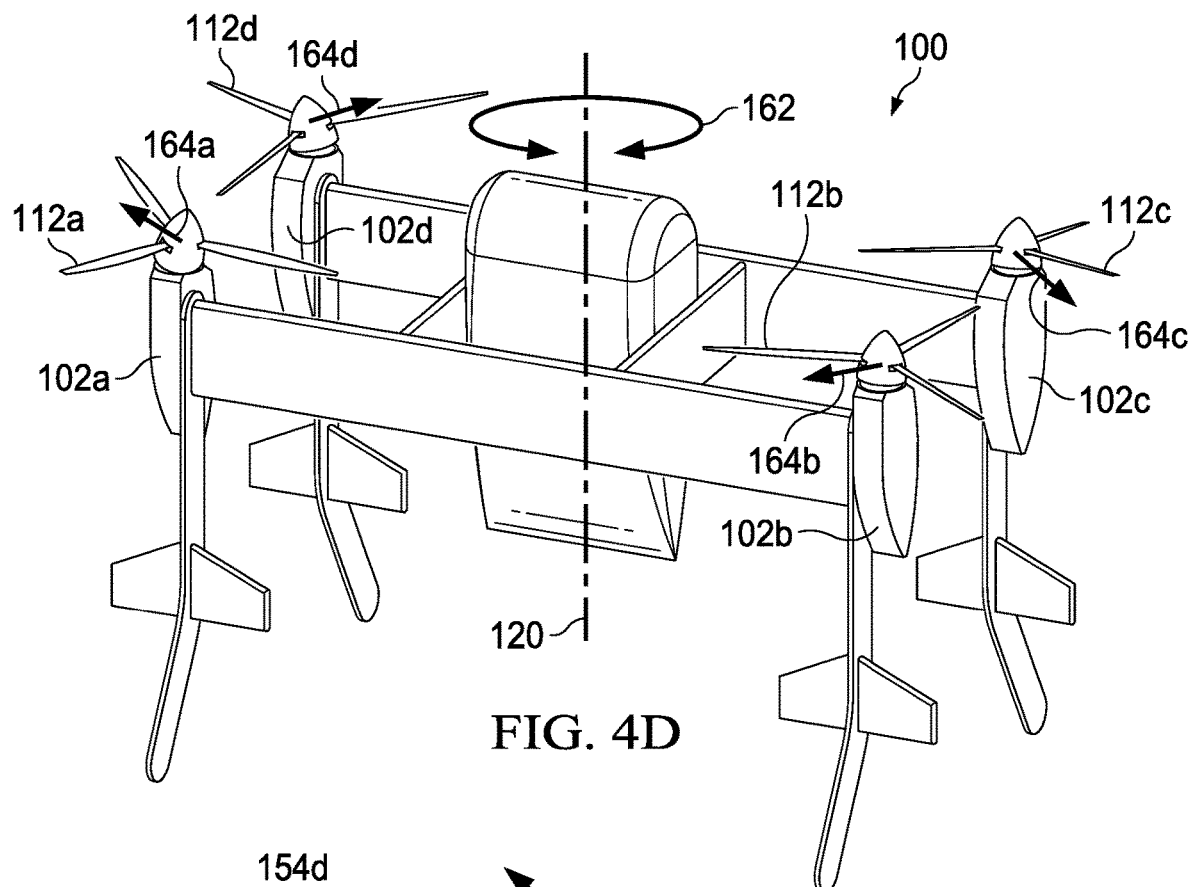
Figure 4C:
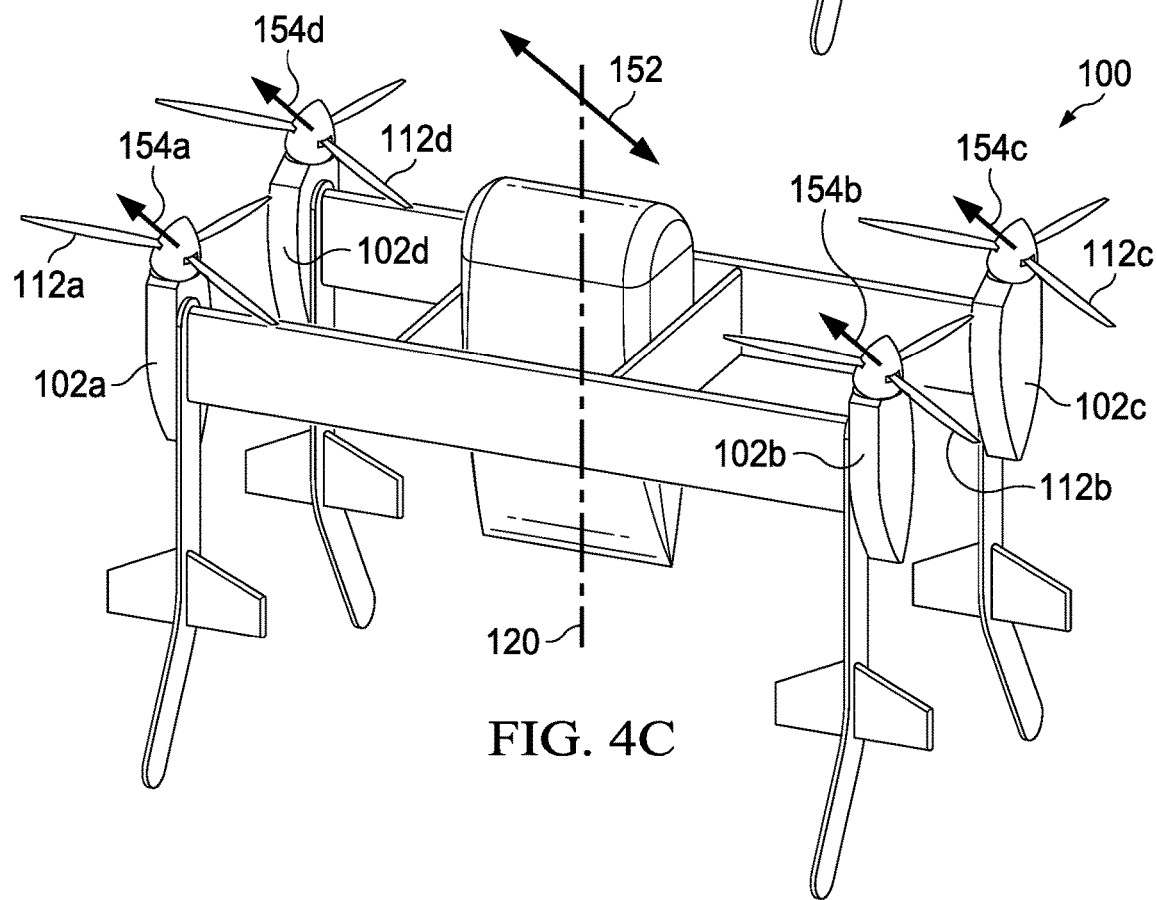

Using both the longitudinal and lateral control authority provided by collective thrust vectoring of propulsion assemblies 102a, 102b, 102c, 102d, provides omnidirectional horizontal control authority for aircraft 100. For example, as best seen in FIG. 4C, aircraft 100 has diagonal control authority responsive to collective thrust vectoring of propulsion assemblies 102a, 102b, 102c, 102d. As illustrated, aircraft 100 has a longitudinal axis 120 and is operable for movement in the diagonal direction as indicated by arrow 152. In the illustrated embodiment, flight control system 114 has sent commands to operate each of actuators 108a, 108b, 108c, 108d and actuators 110a, 110b, 110c, 110d to tilt each of propulsion systems 112a, 112b, 112c, 112d forward/right. In this configuration, propulsion assemblies 102a, 102b, 102c, 102d generate thrust vectors having aft/leftward directed components 154a, 154b, 154c, 154d. In hover, such collective thrust vectoring of propulsion assemblies 102a, 102b, 102c, 102d provides diagonal control authority to aircraft 100.

Figure 5I:
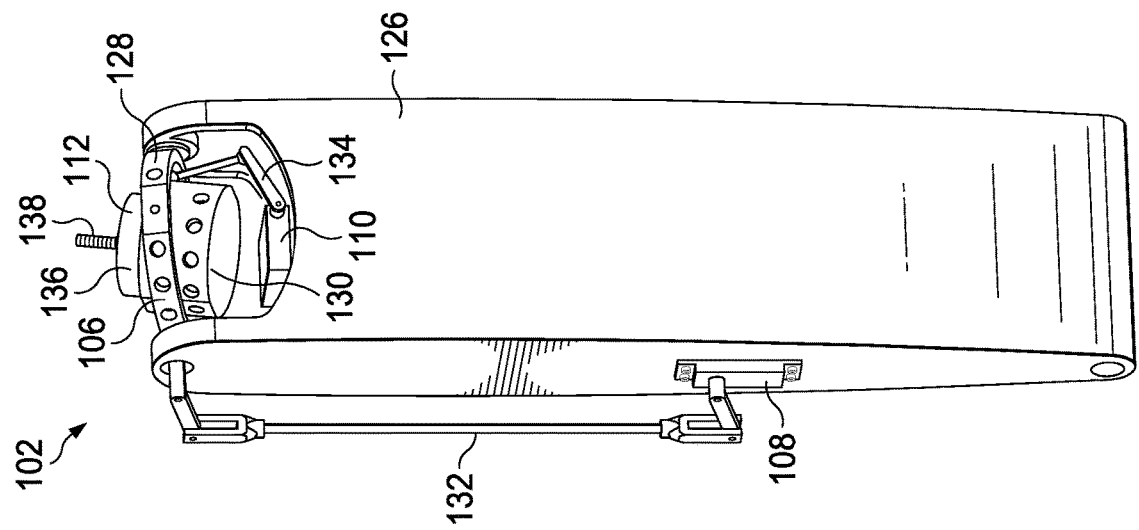
Figure 5H:
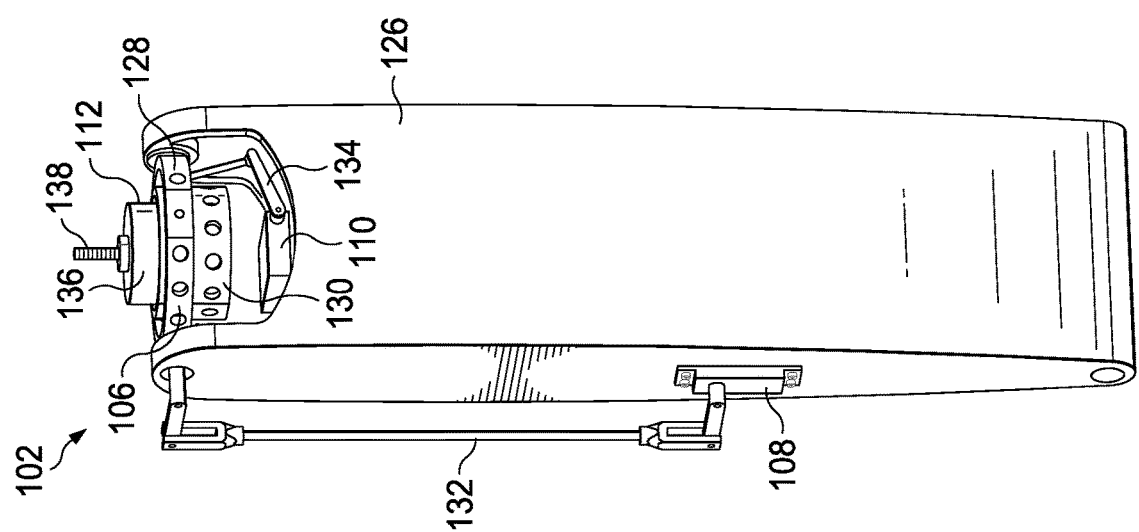
Figure 5G:
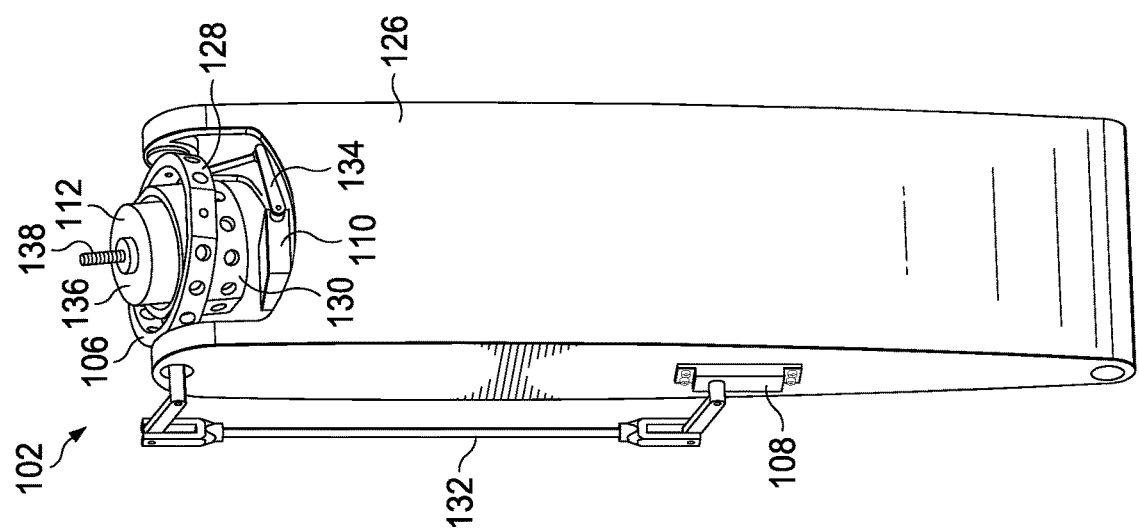

The diagonal thrust vectoring operation will now be described with reference to propulsion assembly 102 in FIGS. 5G-5I. As best seen in the comparison of FIGS. 5G-5I, actuators 108, 110 are operated to tilt propulsion system 112 diagonally between a fully aft/right configuration shown in FIG. 5G and a fully forward/left configuration shown in FIG. 5I as well as in an infinite number of positions therebetween including the fully vertical configuration shown in FIG. 5H. This operation diagonally shifts the thrust vector of propulsion assembly 102 to enable the diagonal control authority of aircraft 100 depicted in FIG. 4C. The maximum diagonal tilt angle of gimbal 106 may preferably be between about 10 degrees and about 30 degrees, may more preferably be between about 15 degrees and about 25 degrees and may most preferably be about 20 degrees. As should be understood by those having ordinary skill in the art, the magnitude of the diagonal component 154 of the thrust vector is related to the direction of the thrust vector, which is determined by the diagonal tilt angle of gimbal 106.

In addition to collective thrust vectoring of propulsion assemblies 102a, 102b, 102c, 102d, aircraft 100 is also operable to engage in differential thrust vectoring of propulsion assemblies 102a, 102b, 102c, 102d. For example, as best seen in FIG. 4D, aircraft 100 has yaw authority responsive to differential thrust vectoring of propulsion assemblies 102a, 102b, 102c, 102d. As illustrated, aircraft 100 has a longitudinal axis 120 and is operable for rotation thereabout as indicated by arrow 162. In the illustrated embodiment, flight control system 114 has sent commands to operate each of actuators 108a, 108b, 108c, 108d and actuators 110a, 110b, 110c, 110d to tilt propulsion system 112a forward/right, to tilt propulsion system 112b aft/right, to tilt propulsion system 112c aft/left and to tilt propulsion system 112d forward/left. In this configuration, propulsion assemblies 102a, 102b, 102c, 102d generate thrust vectors having horizontal components 164a, 164b, 164c, 164d. In hover, such differential thrust vectoring of propulsion assemblies 102a, 102b, 102c, 102d provides yaw authority to aircraft 100.

As discussed herein, outer gimbal member 128 is pivotally coupled to housing 126 and is operable to tilt about the first axis and inner gimbal member 130 is pivotally coupled to outer gimbal member 128 and is operable to tilt about the second axis that is orthogonal to the first axis. In the illustrated embodiment, in order to minimize the energy required to tilt propulsion system 112 relative to housing 126 to change the thrust vector direction of propulsion assembly 102, the first and second axes pass through propulsion system 112. The precise location of the intersection of the axes through propulsion system 112 may be determined based on factors including the mass of propulsion system 112, the size and shape of propulsion system 112, the desired rotational velocity of propulsion system 112 during thrust vectoring and other factors that should be understood by those having ordinary skill in the art. In one implementation, the first and second axes may pass through the center of mass of propulsion system 112. Alternatively, it may be desirable to have the first and second axes pass through a location near the center of mass of propulsion system 112 such as within a predetermined distance from the center of mass of propulsion system 112. The predetermined distance may be selected based upon criteria such as a defined volume surrounding the center of mass that contains a predetermined portion of the total mass of propulsion system 112. For example, the first and second axes may pass through a location within a volume centered at the center of mass of propulsion system 112 that contains no more than ten percent of the mass of propulsion system 112. Such a volume may be expressed, for example, as being within one centimeter, one inch or other predetermined distance from the center of mass of propulsion system 112.

Due to dynamic effects caused by the rotation of the rotor assembly and the lift generated by the rotor assembly during flight operations, such as during thrust-borne flight operations, the center of mass in hover of propulsion system 112 may not coincide with the actual center of mass of propulsion system 112. To compensate for the dynamic effects, the first and second axes may pass through the center of mass in hover of propulsion system 112. Alternatively, it may be desirable to have the first and second axes pass through a location near the center of mass in hover of propulsion system 112 such as within a predetermined distance from the center of mass in hover of propulsion system 112. In one example, it may be desirable to have the first and second axes pass through a location between the center of mass of propulsion system 112 and the center of mass in hover of propulsion system 112.

Referring now to FIGS. 6A-6D, the redundant directional control feature of aircraft 100 will now be described. In the illustrated embodiment, aircraft 100 includes a distributed thrust array depicted as four of propulsion assemblies 102a, 102b, 102c, 102d that form a two-dimensional thrust array. As discussed herein and as best seen in FIG. 3, each propulsion assembly 102a, 102b, 102c, 102d includes an electronics node, a two-axis gimbal operated by two independent actuators and a propulsion system 112a, 112b, 112c, 112d that is operable to tilt with the gimbal relative to the propulsion assembly housing and the airframe of aircraft 100. Flight control system 114 is operable to independently control the operating speeds of each electric motor and is operable to independently control the positions of each actuator such that for each propulsion assembly 102a, 102b, 102c, 102d, a thrust vector can be resolved within a thrust vector cone. Importantly, in the event of an actuator fault or other fault in one of the propulsion assemblies, flight control system 114 sends commands to at least the symmetrically disposed propulsion assembly to counteract the fault. For example, to overcome a thrust vector error in one of the propulsion assemblies, flight control system 114 autonomously engages in corrective operations such as adjusting the thrust vector of the symmetrically disposed propulsion assembly to counteract the thrust vector error. Adjusting the thrust vector of the symmetrically disposed propulsion system may include tilting the propulsion system about the first axis, tilting the propulsion system about the second axis, changing the operating speed of the electric motor and combinations thereof. This autonomous corrective operation capability serves as redundancy in the directional control of aircraft 100 allowing aircraft 100 to have flight control in hover even during fault conditions.

Figure 6B:
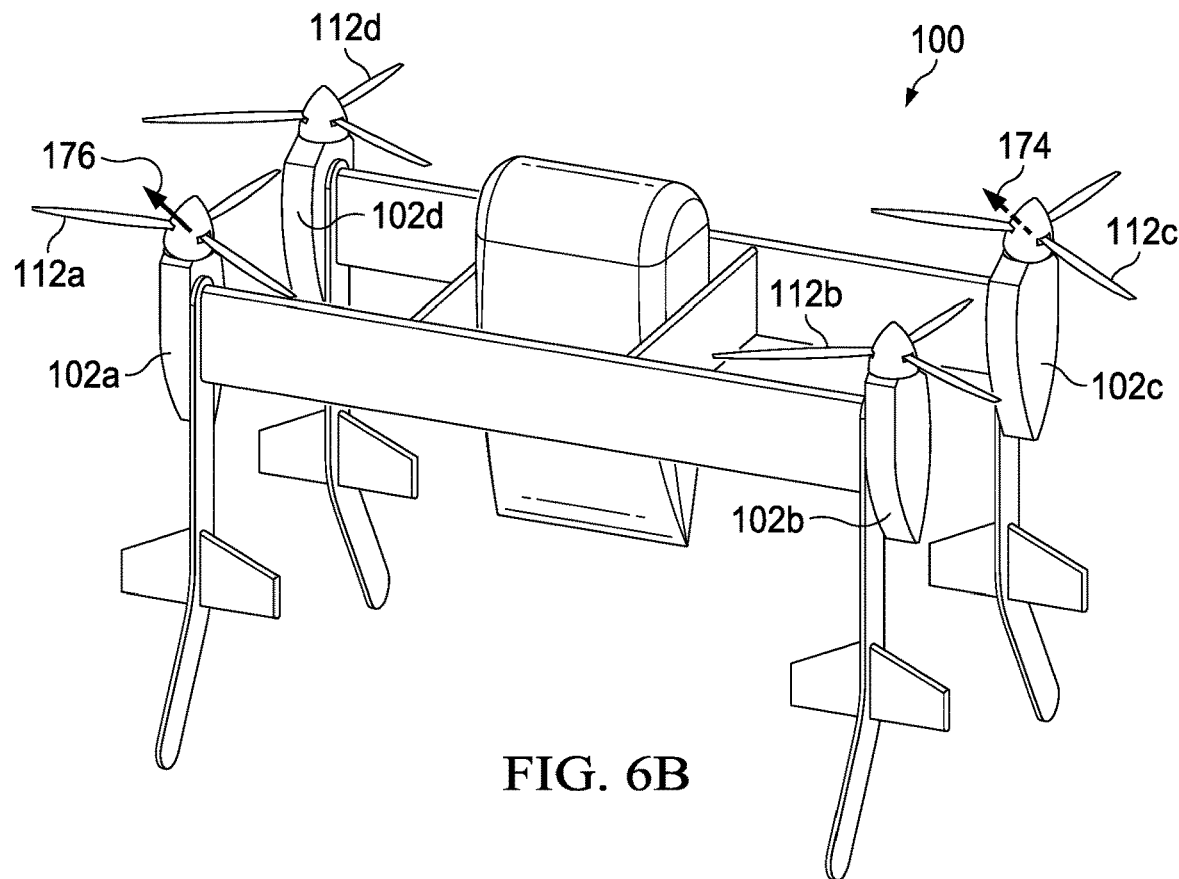
FIGS. 6A-6D are schematic illustrations of an aircraft performing measures to counteract an actuator fault in a propulsion assembly in accordance with embodiments of the present disclosure.
Figure 6A:
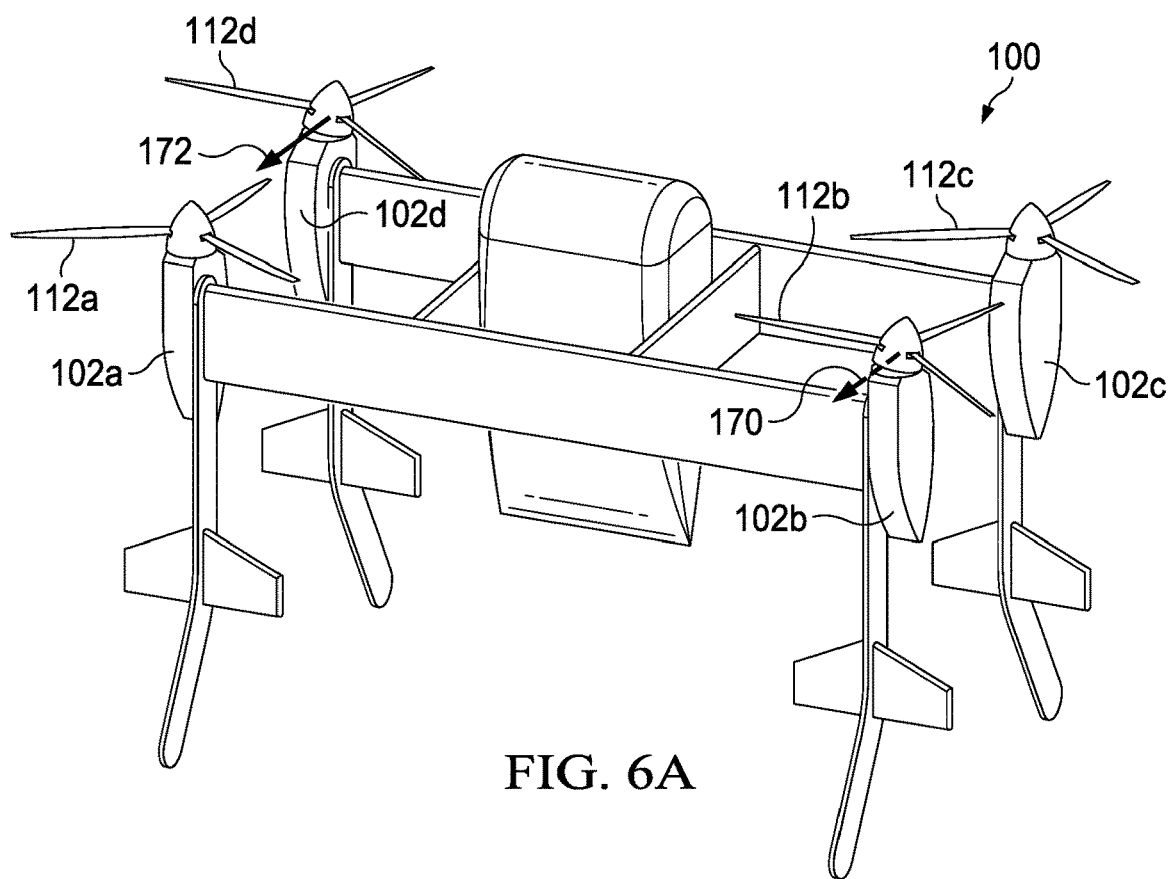

Referring specifically to FIG. 6A, a thrust vector error in propulsion assembly 102b has occurred due to, for example, a static actuator fault causing propulsion system 112b of propulsion assembly 102b to cease tilting in the longitudinal direction. The thrust vector error is depicted as dashed arrow 170. Flight control system 114 recognizes the thrust vector error of propulsion assembly 102b and sends commands to at least propulsion assembly 102d to counteract the single-axis static actuator fault in propulsion assembly 102b. In this case, the commands may include shifting actuator 108d to adjust the thrust vector of propulsion assembly 102d to include a corrective component depicted as solid arrow 172 that maintains the stability of aircraft 100. In addition, flight control system 114 may command propulsion assemblies 102a, 102c to perform addition corrective actions to assist in counteracting the thrust vector error of propulsion assembly 102b. Even in the fault condition, as propulsion assembly 102b continues to provide significant thrust in the vertical direction and thrust vector capability in the lateral direction, it may be desirable to maintain the operation of propulsion assembly 102b until aircraft 100 makes a safe landing allowing the autonomous corrective actions of flight control system 114 to counteract the thrust vector error.

Referring specifically to FIG. 6B, a thrust vector error in propulsion assembly 102c has occurred due to, for example, a static actuator fault causing propulsion system 112c of propulsion assembly 102c to cease tilting in both the longitudinal and lateral directions. The thrust vector error is depicted as dashed arrow 174. Flight control system 114 recognizes the thrust vector error of propulsion assembly 102c and sends commands to at least propulsion assembly 102a to counteract the two-axis static actuator fault in propulsion assembly 102c. In this case, the commands may include shifting actuators 108a, 110a to adjust the thrust vector of propulsion assembly 102a to include a corrective component depicted as solid arrow 176 that maintains the stability of aircraft 100. In addition, flight control system 114 may command propulsion assemblies 102b, 102d to perform addition corrective actions to assist in counteracting the thrust vector error of propulsion assembly 102c. Even in the fault condition, as propulsion assembly 102c continues to provide significant thrust in the vertical direction, it may be desirable to maintain the operation of propulsion assembly 102c until aircraft 100 makes a safe landing allowing the autonomous corrective actions of flight control system 114 to counteract the thrust vector error.

Figure 6D:
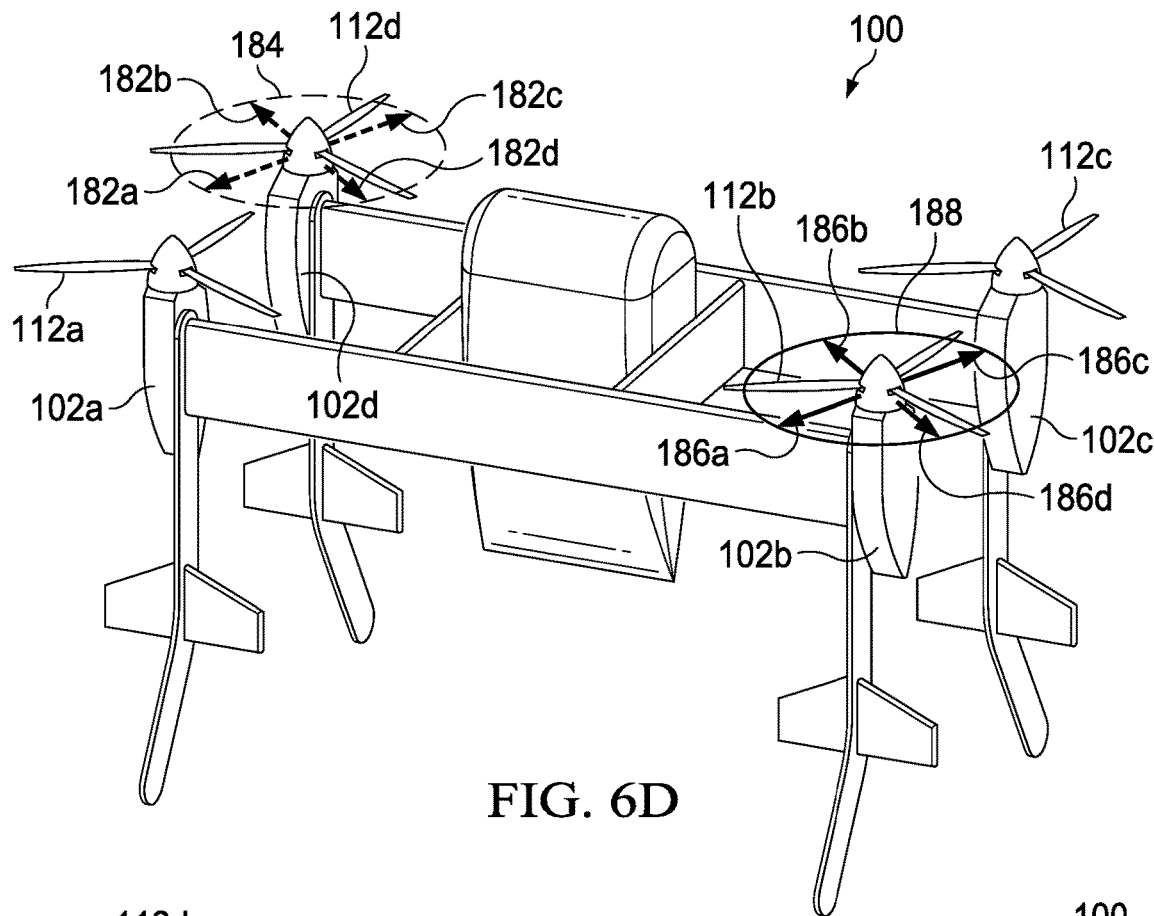
Figure 6C:
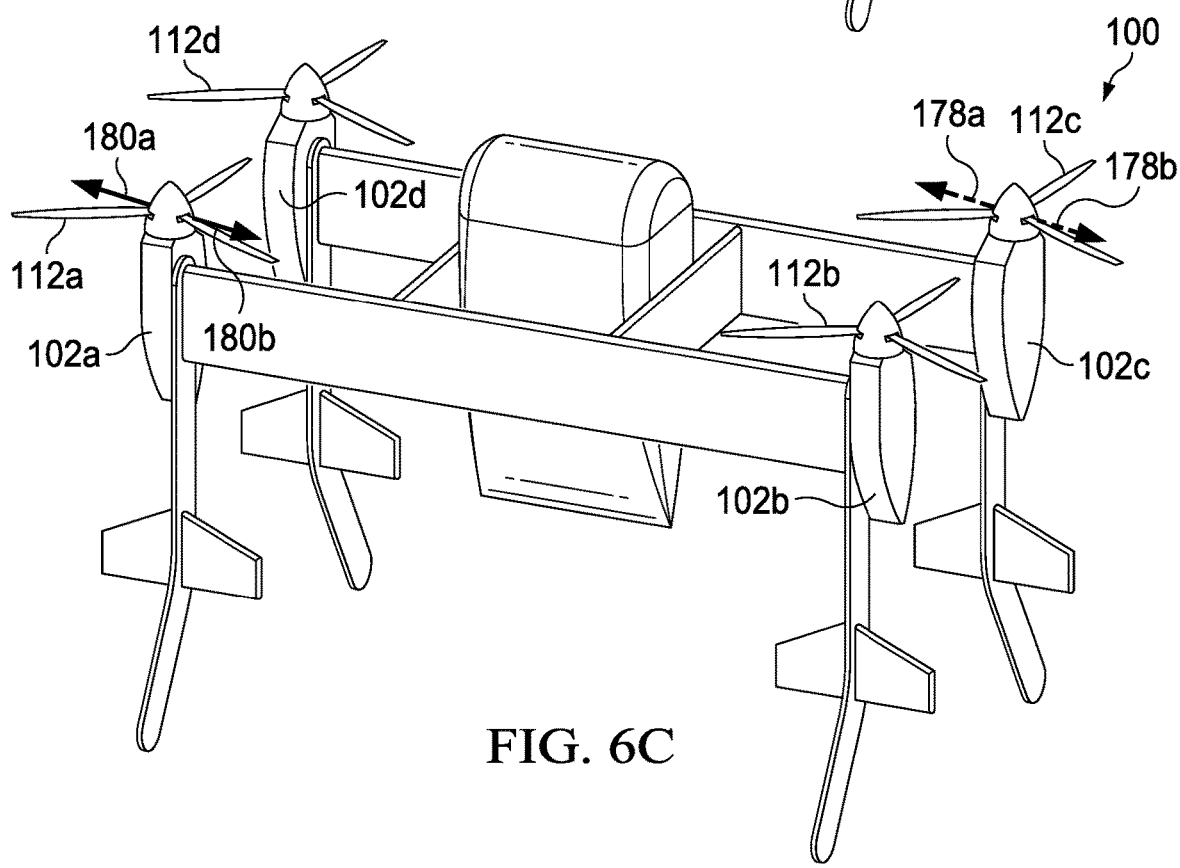

Referring specifically to FIG. 6C, a thrust vector error in propulsion assembly 102c has occurred due to, for example, a single-axis dynamic actuator fault causing propulsion system 112c of propulsion assembly 102b to tilt uncontrolled in the lateral direction. The thrust vector error is depicted as dashed arrows 178a, 178b that represent a continuum between maximum error positions. Flight control system 114 recognizes the thrust vector error of propulsion assembly 102c and sends commands to at least propulsion assembly 102a to counteract the single-axis dynamic actuator fault in propulsion assembly 102c. In this case, the commands may include continually shifting actuator 110a to dynamically adjust the thrust vector of propulsion assembly 102a to include the time dependent corrective component depicted as solid arrows 180a, 180b representing the continuum between maximum corrective positions. The corrective action maintains the stability of aircraft 100. In addition, flight control system 114 may command propulsion assemblies 102b, 102d to perform addition corrective actions to assist in counteracting the thrust vector error of propulsion assembly 102c. Even in the fault condition, as propulsion assembly 102c continues to provide significant thrust in the vertical direction, it may be desirable to maintain the operation of propulsion assembly 102c until aircraft 100 makes a safe landing allowing the autonomous corrective actions of flight control system 114 to counteract the thrust vector error.

Referring specifically to FIG. 6D, a thrust vector error in propulsion assembly 102d has occurred due to, for example, a two-axis dynamic actuator fault causing propulsion system 112d of propulsion assembly 102d to tilt uncontrolled in the longitudinal and lateral directions. The thrust vector error is depicted as dashed arrows 182a, 182b, 182c, 182d within dashed circle 184 representing the universe of error positions. Flight control system 114 recognizes the thrust vector error of propulsion assembly 102d and sends commands to at least propulsion assembly 102b to counteract the two-axis dynamic actuator fault in propulsion assembly 102d. In this case, the commands may include continually shifting actuators 108b, 110b to dynamically adjust the thrust vector of propulsion assembly 102b to include the time dependent corrective component depicted as solid arrows 186a, 186b, 186c, 186d within solid circle 188 representing the universe of corrective positions. The corrective action maintains the stability of aircraft 100. In addition, flight control system 114 may command propulsion assemblies 102a, 102c to perform addition corrective actions to assist in counteracting the thrust vector error of propulsion assembly 102b. Even in the fault condition, as propulsion assembly 102d continues to provide significant thrust in the vertical direction, it may be desirable to maintain the operation of propulsion assembly 102d until aircraft 100 makes a safe landing allowing the autonomous corrective actions of flight control system 114 to counteract the thrust vector error.

In addition to performing autonomous corrective actions to counteract a thrust vector error, flight control system 114 may autonomously command aircraft 100 to perform other flight maneuvers. Depending upon the type of fault and the magnitude of the thrust vector error caused by the fault, flight control system 114 may command aircraft 100 to return to a maintenance center or other predetermined location. Under other fault situations, flight control system 114 may command aircraft 100 to initiate a jettison sequence of the pod assembly or other payload and/or perform an emergency landing. If the fault is not critical and/or is suitably overcome by the corrective actions described herein, flight control system 114 may command aircraft 100 to continue the current mission. In this case, flight control system 114 may command aircraft 100 to adjust the center of mass of the pod assembly or other payload relative to the airframe such as lowering the elevation of the pod assembly relative to the airframe as this may improve hover stability.

Figure 7:
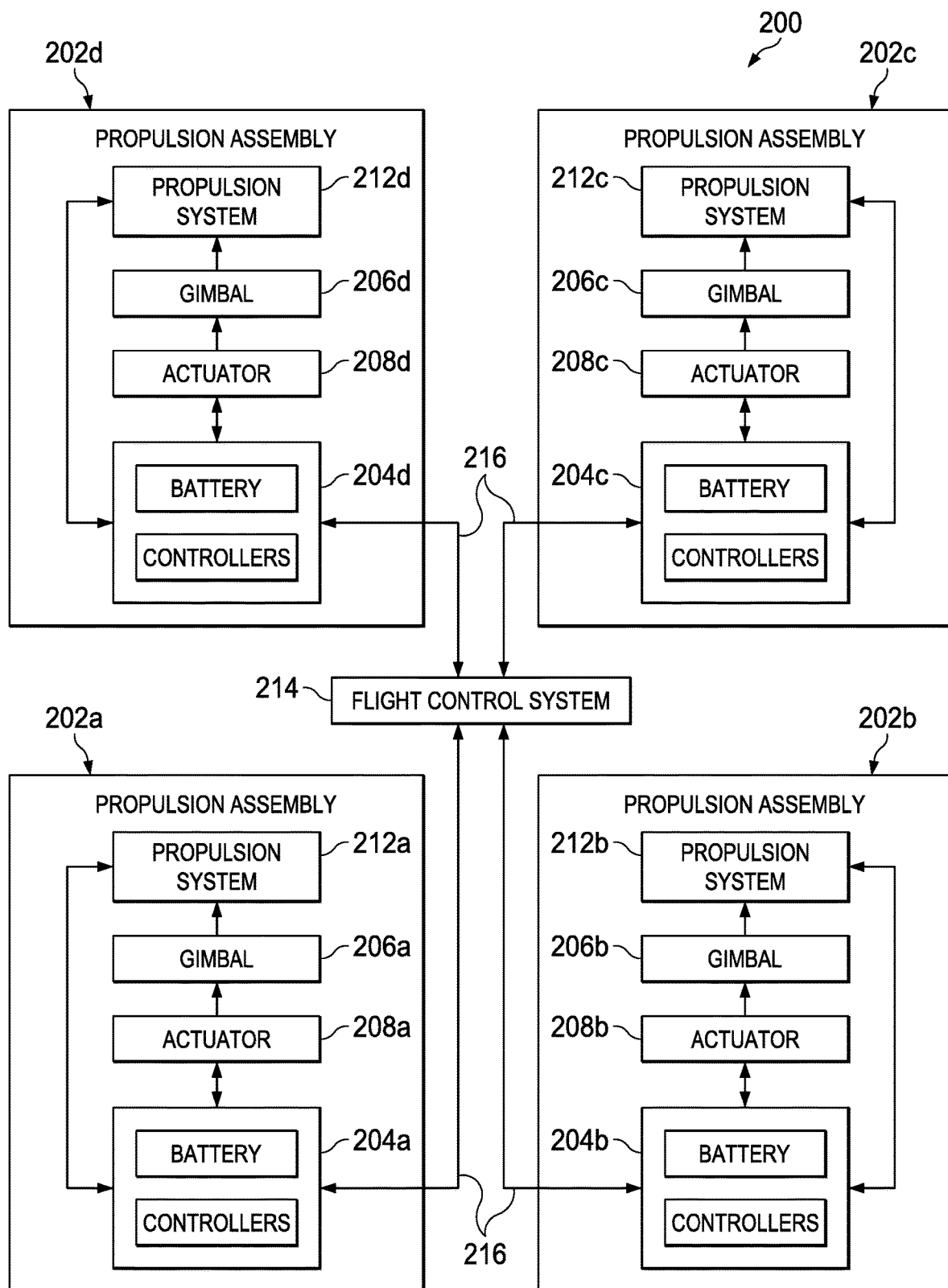
FIG. 7 is a block diagram of a two-dimensional distributed thrust array having single-axis gimbal mounted propulsion systems for an aircraft in accordance with embodiments of the present disclosure.

Referring next to FIG. 7, the directional control of an aircraft 200 having a distributed thrust array including single-axis gimbal mounted propulsion systems will now be described. Aircraft 200 includes a distributed thrust array depicted as four of propulsion assemblies 202a, 202b, 202c, 202d that form a two-dimensional thrust array. Propulsion assembly 202a includes electronics node 204a, single-axis gimbal 206a operated by actuator 208a and propulsion system 112a. Propulsion assembly 202b includes electronics node 204b, single-axis gimbal 206b operated by actuator 208b and propulsion system 112b. Propulsion assembly 202c includes electronics node 204c, single-axis gimbal 206c operated by actuator 208c and propulsion system 112c. Propulsion assembly 202d includes electronics node 204d, single-axis gimbal 206d operated by actuator 208d and propulsion system 112d. Each of electronics nodes 204a, 204b, 204c, 204d includes one or more batteries and one or more controllers such as an electronic speed controller. As discussed herein, each of propulsion systems 202a, 202b, 202c, 202d includes an electric motor having an output drive and a rotor assembly having a plurality of rotor blades. Each rotor assembly is rotatable with the respective output drive of the electric motor in a rotational plane to generate thrust. A flight control system 214 is operably associated with propulsion assemblies 202a, 202b, 202c, 202d and is communicably linked to electronic nodes 204a, 204b, 204c, 204d by communications network 216. Flight control system 214 send commands to electronic nodes 204a, 204b, 204c, 204d to enable flight control system 214 to independently control each of propulsion assemblies 202a, 202b, 202c, 202d.

Figure 8B:
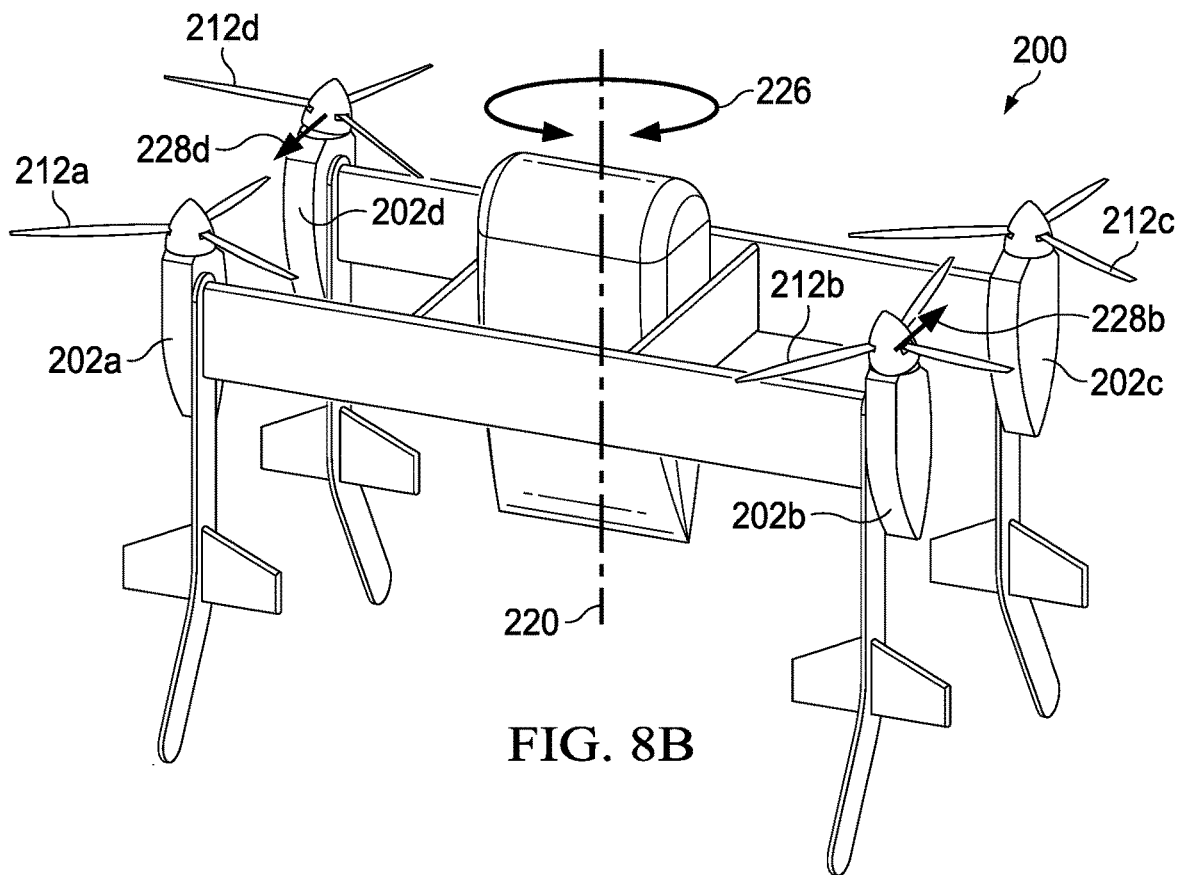
FIGS. 8A-8B are schematic illustrations of an aircraft performing various flight maneuvers in accordance with embodiments of the present disclosure.
Figure 8A:
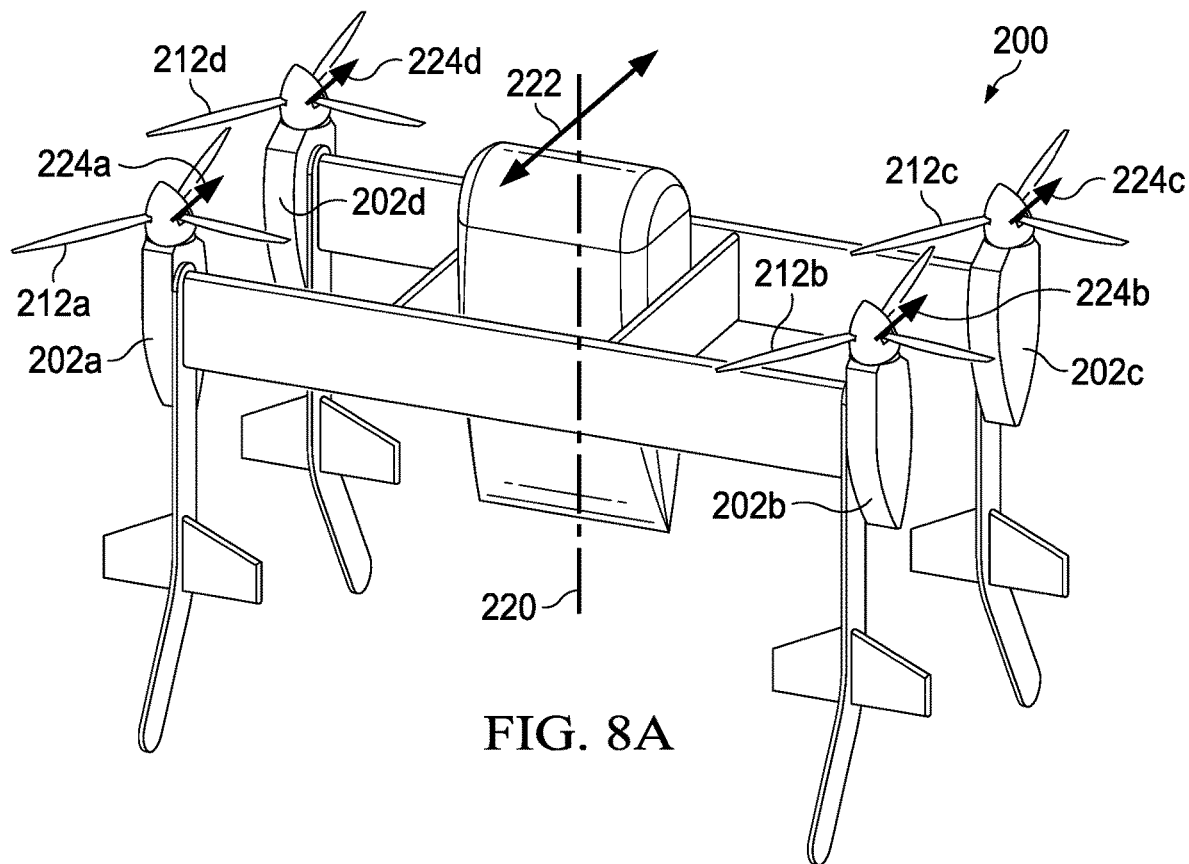

For example, as best seen in FIG. 8A, aircraft 200 has longitudinal control authority responsive to collective thrust vectoring of propulsion assemblies 202a, 202b, 202c, 202d. As illustrated, aircraft 200 has a longitudinal axis 220 and is operable for movement in the longitudinal direction as indicated by arrow 222. Flight control system 214 has sent commands to operate each of actuators 208a, 208b, 208c, 208d to tilt each of propulsion systems 212a, 212b, 212c, 212d in the forward direction. In this configuration, propulsion assemblies 202a, 202b, 202c, 202d generate thrust vectors having aftward directed longitudinal components 224a, 224b, 224c, 224d. In hover, such collective thrust vectoring of propulsion assemblies 202a, 202b, 202c, 202d provides longitudinal control authority to aircraft 200.

The longitudinal thrust vectoring operation will now be described with reference to an exemplary propulsion assembly 202, depicted as a line replaceable propulsion unit, in FIGS. 9A-9C. Propulsion assembly 202 includes a housing 226 and a gimbal 206 that is pivotally coupled to housing 126 and is operable to tilt about a single axis. In the illustrated embodiment, actuator 208 is coupled between housing 226 and gimbal 206 such that operation of actuator 208 shifts linkage 232 to tilt gimbal 206 about the axis relative to housing 226. A propulsion system 212 is coupled to and is operable to tilt with gimbal 206 about the axis relative to housing 226. In the illustrated embodiment, the rotor assembly has been removed from propulsion system 212 such that only electric motor 236 and output drive 238 are visible in the figures.

Figure 9C:
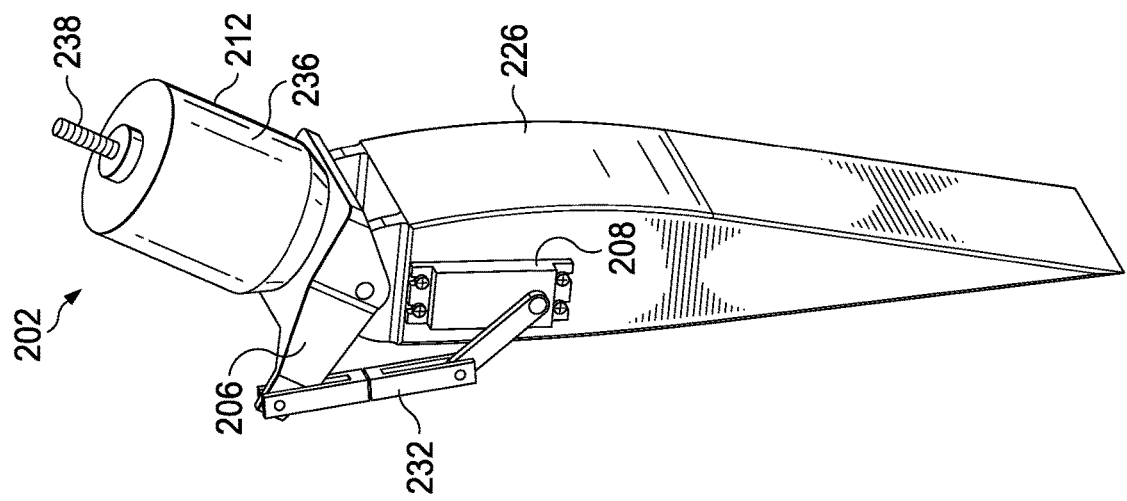
FIGS. 9A-9C are schematic illustrations of a line replaceable propulsion unit operating a single-axis gimbal for an aircraft in accordance with embodiments of the present disclosure.
Figure 9B:
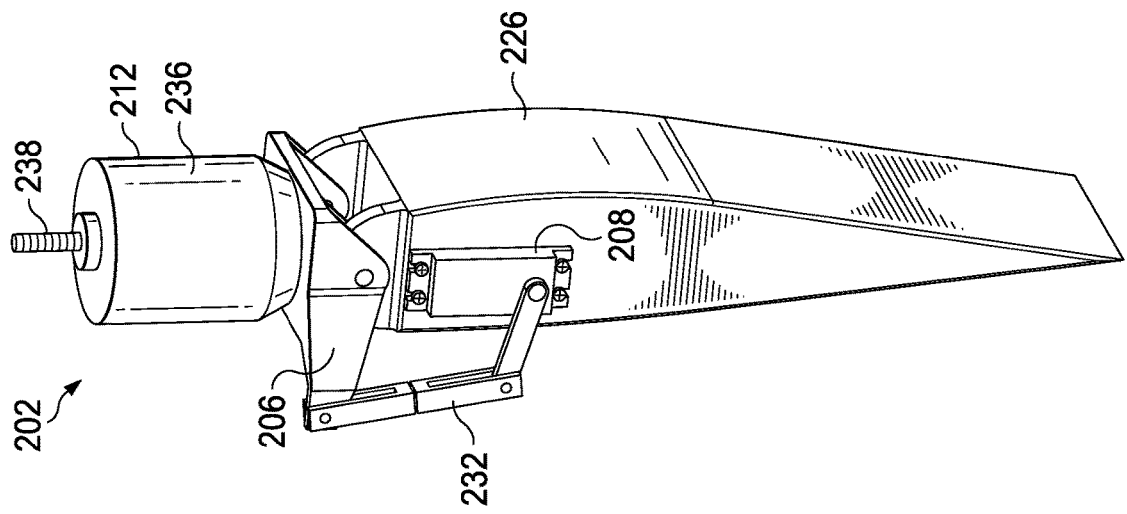
Figure 9A:
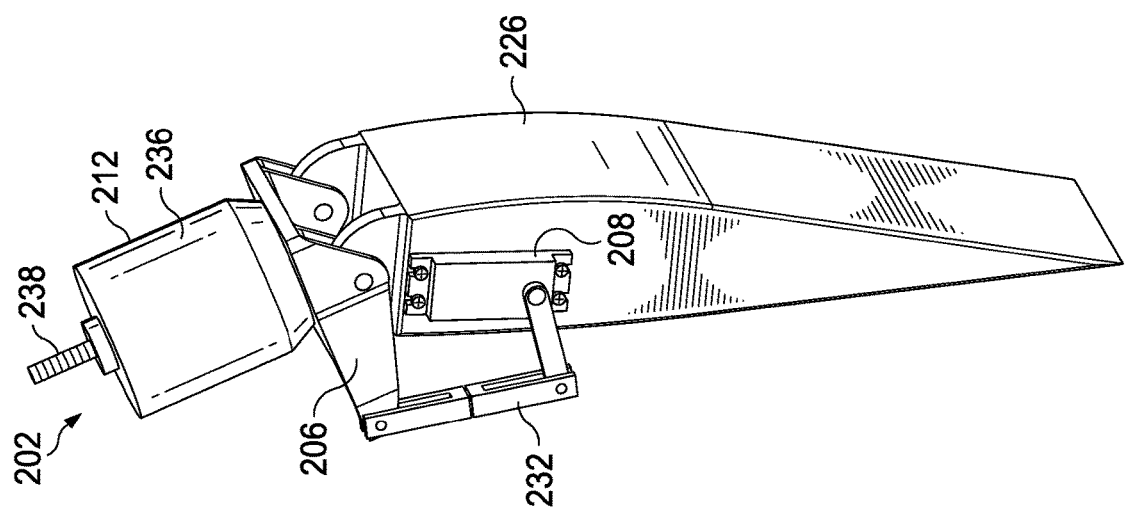
Figure 10A:
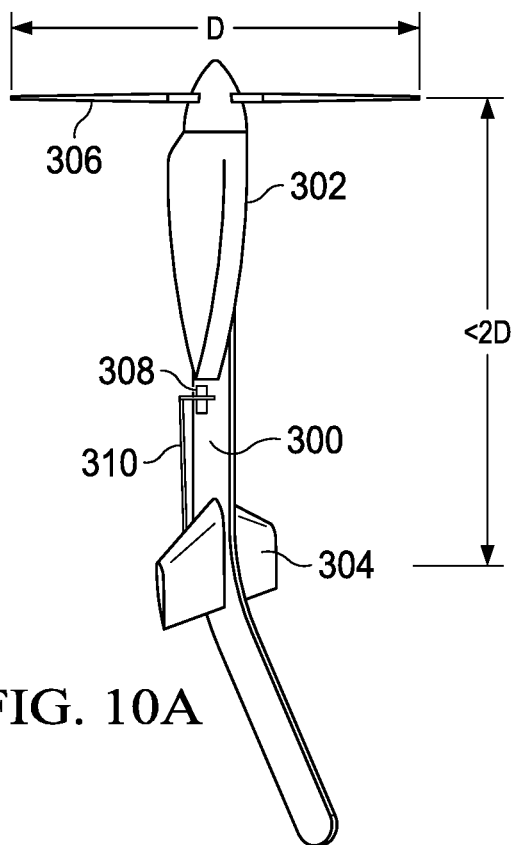
FIGS. 10A-10D are schematic illustrations of a tail member having a control surface and a line replaceable propulsion unit coupled thereto for an aircraft in accordance with embodiments of the present disclosure.
Figure 10B:
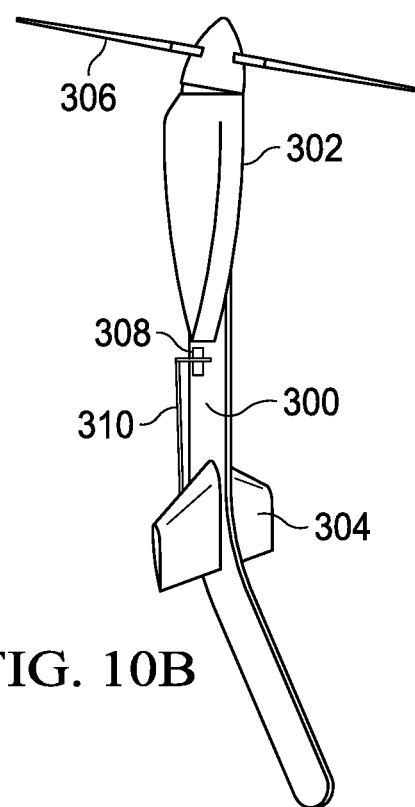
Figure 10C:
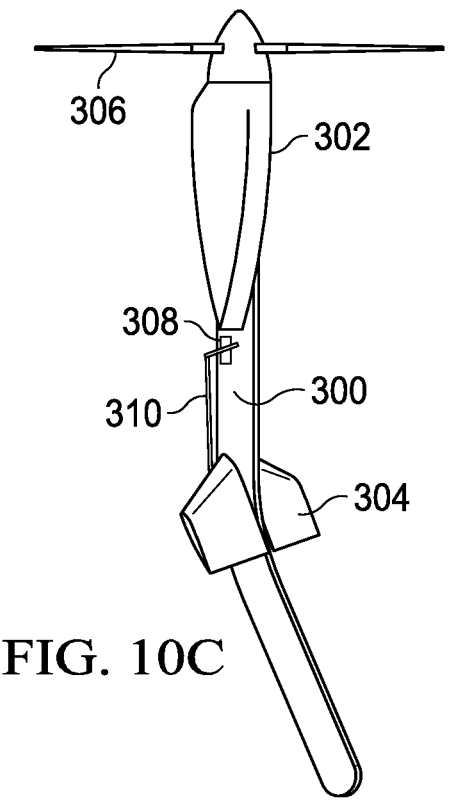
Figure 10D:
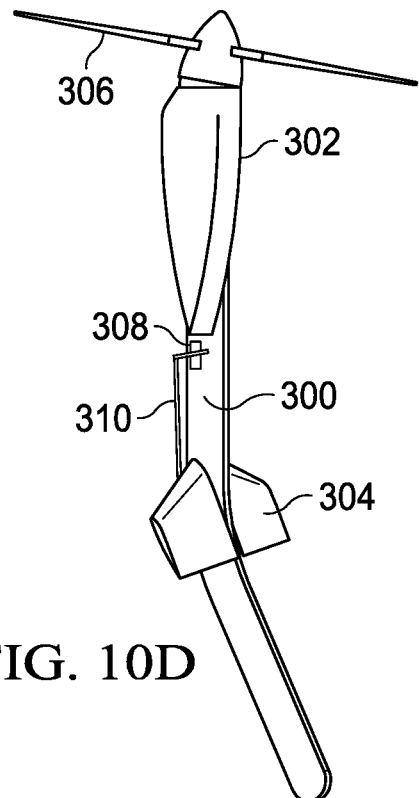

As best seen in the comparison of FIGS. 9A-9C, actuator 208 is operated to tilt propulsion system 212 longitudinally between a fully forward configuration shown in FIG. 9A and a fully aft configuration shown in FIG. 9C as well as in an infinite number of positions therebetween including the fully vertical configuration shown in FIG. 9B. This operation longitudinally shifts the thrust vector of propulsion assembly 202 to enable the longitudinal control authority of aircraft 200 depicted in FIG. 8A. The maximum longitudinal tilt angle of gimbal 206 may preferably be between about 10 degrees and about 30 degrees, may more preferably be between about 15 degrees and about 25 degrees and may most preferably be about 20 degrees. As should be understood by those having ordinary skill in the art, the magnitude of the longitudinal component 224 of the thrust vector is related to the direction of the thrust vector, which is determined by the longitudinal tilt angle of gimbal 206.

In the illustrated embodiment, the single gimbal axis is located below propulsion system 212. In other single gimbal axis embodiments and similar to propulsion assembly 102 of FIGS. 5A-5I, the single gimbal axis could alternately pass through propulsion system 212. For example, the single gimbal axis could pass through the center of mass of propulsion system 212 or through a location near the center of mass of propulsion system 212, such as within a predetermined distance from the center of mass of propulsion system 212. As another example, the single gimbal axis could pass through the center of mass in hover of propulsion system 212, through a location near the center of mass in hover of propulsion system 112, such as within a predetermined distance from the center of mass in hover of propulsion system 112, or through a location between the center of mass of propulsion system 212 and the center of mass in hover of propulsion system 212.

In addition to collective thrust vectoring of propulsion assemblies 202a, 202b, 202c, 202d, aircraft 200 is also operable to engage in differential longitudinal thrust vectoring of propulsion assemblies 202a, 202b, 202c, 202d. For example, as best seen in FIG. 8B, aircraft 200 has yaw authority responsive to differential longitudinal thrust vectoring of propulsion assemblies 202b, 202d. As illustrated, aircraft 200 has a longitudinal axis 220 and is operable for rotation thereabout as indicated by arrow 226. Flight control system 214 has sent commands to operate actuator 208b to tilt propulsion system 212b forward and to operate actuator 208d to tilt propulsion system 212d aftward. In this configuration, propulsion assembly 212b generates a thrust vector having an aftward directed longitudinal component 228b and propulsion assembly 212d generates a thrust vector having a forward directed longitudinal component 228d. In hover, such differential longitudinal thrust vectoring of symmetrically disposed propulsion assemblies, such as propulsion assemblies 202b, 202d, provides yaw authority to aircraft 200.

Referring to FIGS. 10A-10D, various independent mechanisms for providing yaw authority in hover to an aircraft of the present disclosure will now be described. Aircraft 10 described above will be used as the example aircraft for the present discussion wherein aircraft 10 would include four of the illustrated tail sections. Each tail section includes a tail member 300 depicted with a propulsion assembly 302 and a control surface 304 coupled thereto. Propulsion assembly 302 includes a rotor assembly 306 and may represent any propulsion assembly discussed herein including propulsion assemblies operable for single-axis thrust vectoring, two-axis thrust vectoring or no thrust vectoring. Control surface 304 is an active control surface operable for tilting in the longitudinal direction of aircraft 10 by actuator 308 via linkage 310 responsive to commands from flight control system 32. In the illustrated embodiment, rotor assembly 306 has a rotor diameter D and control surface 304 is less than two rotor diameters (2D) and preferably between one rotor diameter and two rotor diameters from rotor assembly 306. Locating control surface 304 within the specified distance from rotor assembly 306 enables control surface 304 to operate in the propwash of rotor assembly 306 in both thrust-borne flight and wing-borne flight.

If aircraft 10 utilizes embodiments of propulsion assembly 302 with no thrust vectoring, aircraft 10 has two independent yaw authority mechanisms in hover. In one approach, differential speed control is used to change the relative rotor speeds of the rotor assemblies rotating clockwise compared to the rotor assemblies rotating counterclockwise causing a torque imbalance in aircraft 10, which provides yaw authority. This operation may be represented by the tail section configuration in FIG. 10A. In the other approach, differential longitudinal control surface maneuvers of control surfaces 304 of two symmetrically disposed tail sections are used to create a yaw moment responsive to propwash blowing over the tilted control surfaces 304. This operation may be represented by the tail section configuration in FIG. 10C. Depending upon the yaw authority requirement, it may be desirable to use one yaw authority mechanism instead of another due to factors such as the response rate and yaw moment of a particular yaw authority mechanism. For example, a yaw authority mechanism with a faster response rate may be preferred for small and/or continuous corrections while a yaw authority mechanism with a larger yaw moment may be preferred for large correction and/or certain aircraft maneuvers such as large rotations about the longitudinal axis. In addition, an aircraft 10 having non thrust vectoring propulsion assemblies 302 may use a combination of differential speed control and differential longitudinal control surface maneuvers to provide yaw authority. This operation may be represented by the tail section configuration in FIG. 10C.

If aircraft 10 utilizes embodiments of propulsion assembly 302 having single-axis or two-axis thrust vectoring, aircraft 10 has three independent yaw authority mechanisms in hover. In one approach, differential speed control is used to change the relative rotor speeds of the rotor assemblies rotating clockwise compared to the rotor assemblies rotating counterclockwise causing a torque imbalance in aircraft 10, which provides yaw authority. This operation may be represented by the tail section configuration in FIG. 10A. In another approach, differential longitudinal control surface maneuvers of control surfaces 304 of two symmetrically disposed tail sections are used to create a yaw moment responsive to propwash blowing over the tilted control surfaces 304. This operation may be represented by the tail section configuration in FIG. 10C. In the next approach, differential thrust vectoring is used to generate a yaw moment. In either single or two-axis thrust vectoring embodiments, this may be achieved by differential longitudinal thrust vectoring of two symmetrically disposed propulsion systems (see FIG. 8B). In addition, in two-axis thrust vectoring embodiments, this may be achieved by differential thrust vectoring of all propulsion systems by suitably clocking the thrust vectors at approximately 90 degrees from one another (see FIG. 4D). This operation may be represented by the tail section configuration in FIG. 10B. Depending upon the yaw authority requirement, it may be desirable to use a faster response rate yaw authority mechanism for small and/or continuous corrections and a yaw authority mechanism with a larger yaw moment for large correction and/or certain aircraft maneuvers.

In addition, an aircraft 10 having thrust vectoring propulsion assemblies 302 may use a combination of differential speed control, differential longitudinal control surface maneuvers and differential thrust vectoring to provide yaw authority. For example, aircraft 10 could utilize differential speed control in combination with differential longitudinal control surface maneuvers, which may be represented by the tail section configuration in FIG. 10C. As another example, aircraft 10 could utilize differential speed control in combination with differential thrust vectoring, which may be represented by the tail section configuration in FIG. 10B. As a further example, aircraft 10 could utilize differential longitudinal control surface maneuvers in combination with differential thrust vectoring, which may be represented by the tail section configuration in FIG. 10D. In a final example, aircraft 10 could utilize differential speed control in combination with differential longitudinal control surface maneuvers and differential thrust vectoring, which may be represented by the tail section configuration in FIG. 10D.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft having redundant directional control, the aircraft comprising:
    an airframe;
    a two-dimensional distributed thrust array attached to the airframe, the thrust array including a plurality of propulsion assemblies, each propulsion assembly including a gimbal and a propulsion system coupled to and operable to tilt with the gimbal, the propulsion system including a rotor assembly having a plurality of rotor blades, the rotor assembly rotatable in a rotational plane to generate thrust having a thrust vector; and
    a flight control system operable to independently control each of the propulsion assemblies;
    wherein, responsive to a thrust vector error of a first propulsion assembly, the flight control system commands at least a second propulsion assembly that is symmetrically disposed relative to the first propulsion assembly to counteract the thrust vector error, thereby providing redundant directional control for the aircraft.

2. The aircraft as recited in claim 1 wherein the flight control system further comprises a redundant flight control system.

3. The aircraft as recited in claim 1 wherein the flight control system further comprises a triply redundant flight control system.

4. The aircraft as recited in claim 1 wherein the commands of the flight control system to the second propulsion assembly are selected from the group consisting of tilting the second propulsion assembly about a first axis, tilting the second propulsion assembly about a second axis, changing an operating speed of the rotor assembly of the second propulsion assembly and combinations thereof.

5. The aircraft as recited in claim 1 wherein the thrust vector error of the first propulsion assembly further comprises an actuator fault in the first propulsion assembly.

6. The aircraft as recited in claim 5 wherein the actuator fault in the first propulsion assembly further comprises a static actuator fault causing the propulsion system of the first propulsion assembly to cease tilting about one axis and wherein the flight control system commands the second propulsion assembly to counteract the single axis static actuator fault.

7. The aircraft as recited in claim 5 wherein the actuator fault in the first propulsion assembly further comprises a static actuator fault causing the propulsion system of the first propulsion assembly to cease tilting about two axes and wherein the flight control system commands the second propulsion assembly to counteract the two-axis static actuator fault.

8. The aircraft as recited in claim 5 wherein the actuator fault in the first propulsion assembly further comprises a dynamic actuator fault causing the propulsion system of the first propulsion assembly to tilt uncontrolled about one axis and wherein the flight control system commands the second propulsion assembly to counteract the single axis dynamic actuator fault.

9. The aircraft as recited in claim 5 wherein the actuator fault in the first propulsion assembly further comprises a dynamic actuator fault causing the propulsion system of the first propulsion assembly to tilt uncontrolled about two axes and wherein the flight control system commands the second propulsion assembly to counteract the two-axis dynamic actuator fault.

10. The aircraft as recited in claim 1 wherein, responsive to the thrust vector error of the first propulsion assembly, the flight control system commands at least two other propulsion assemblies to counteract the thrust vector error, thereby providing redundant directional control for the aircraft.

11. The aircraft as recited in claim 1 wherein, responsive to the thrust vector error of the first propulsion assembly, the flight control system commands the aircraft to land at a predetermined location.

12. The aircraft as recited in claim 1 wherein, responsive to the thrust vector error of the first propulsion assembly, the flight control system commands the aircraft to perform an emergency landing.

13. The aircraft as recited in claim 1 wherein, responsive to the thrust vector error of the first propulsion assembly, the flight control system commands the aircraft to continue a current mission.

14. The aircraft as recited in claim 1 wherein, responsive to the thrust vector error of the first propulsion assembly, the flight control system commands the aircraft to adjust a center of mass of a payload relative to the airframe.

15. The aircraft as recited in claim 1 wherein, responsive to the thrust vector error of the first propulsion assembly, the flight control system commands the aircraft to initiate a jettison sequence.

16. The aircraft as recited in claim 1 wherein the plurality of propulsion assemblies further comprises at least four propulsion assemblies forming the two-dimensional thrust array.

17. The aircraft as recited in claim 1 further comprising a thrust-borne flight mode and a wing-borne flight mode.

18. The aircraft as recited in claim 1 wherein the airframe further comprises first and second wings having at least first and second pylons extending therebetween and having a plurality of tail members extending therefrom, each tail member having a control surface.

19. The aircraft as recited in claim 1 further comprising a pod assembly coupled to the airframe.

20. An aircraft having a thrust-borne flight mode and a wing-borne flight mode, the aircraft comprising:
- an airframe having first and second wings with at least first and second pylons extending therebetween and with a plurality of tail members extending therefrom;
- a pod assembly coupled to the airframe between the first and second pylons;
- a two-dimensional distributed thrust array attached to the airframe, the thrust array including a plurality of propulsion assemblies, each propulsion assembly including a gimbal and a propulsion system coupled to and operable to tilt with the gimbal, the propulsion system including a rotor assembly having a plurality of rotor blades, the rotor assembly rotatable in a rotational plane to generate thrust having a thrust vector; and
- a flight control system operable to independently control each of the propulsion assemblies;
- wherein, responsive to a thrust vector error of a first propulsion assembly, the flight control system commands at least a second propulsion assembly that is symmetrically disposed relative to the first propulsion assembly to counteract the thrust vector error, thereby providing redundant directional control for the aircraft.

\* \* \* \* \*